United States Patent [19]

Briese

[11] Patent Number: 4,682,916
[45] Date of Patent: Jul. 28, 1987

[54] CUTTING INSERT ARRANGEMENT

[76] Inventor: Leonard A. Briese, 5039 Browndeed La., Rancho Palos Verdes, Calif. 90274

[21] Appl. No.: 877,291

[22] Filed: Jun. 23, 1986

Related U.S. Application Data

[62] Division of Ser. No. 600,806, Apr. 16, 1984, Pat. No. 4,621,955.

[51] Int. Cl.$^4$ .......... B23B 27/22; B23C 5/02; B26D 1/00
[52] U.S. Cl. .................... 407/113; 407/11; 407/42; 407/103; 407/114; 408/59; 408/713
[58] Field of Search ............ 407/7, 11, 42, 59, 103, 407/113, 114, 115, 116, 117, 120; 408/56, 57, 59, 60, 61, 713

[56] References Cited

U.S. PATENT DOCUMENTS

| | | | |
|---|---|---|---|
| 1,542,007 | 6/1925 | Schroeder | 407/113 |
| 1,577,952 | 3/1926 | Carnegie | 407/113 |
| 3,213,716 | 10/1965 | Getts | 407/113 |
| 3,293,727 | 12/1966 | Simms | 407/11 |
| 3,670,380 | 6/1972 | Moore et al. | 407/113 |
| 4,093,392 | 6/1978 | Hopkins | 407/59 |
| 4,367,990 | 1/1983 | Porat et al. | 407/114 |
| 4,621,955 | 11/1986 | Briese | 407/113 |

FOREIGN PATENT DOCUMENTS

| | | | |
|---|---|---|---|
| 713503 | 10/1941 | Fed. Rep. of Germany | 407/114 |
| 607770 | 9/1948 | United Kingdom | 407/113 |
| 2057939 | 4/1981 | United Kingdom | 407/114 |
| 523761 | 10/1976 | U.S.S.R. | 407/7 |

Primary Examiner—Nicholas P. Godici
Assistant Examiner—Jerry Kearns
Attorney, Agent, or Firm—Don B. Finkelstein

[57] ABSTRACT

A conical cutting insert. The insert is comprised of a body member with first and second end sections oppositely disposed from a median plane. One or both of the end sections may be provided with a cutting edge. The cutting edge is formed by the intersection of an interior outwardly tapered cutting surface and an exterior inwardly tapered flank surface. The cutting surface may be frustro-conical or one or more planar surfaces. The flank surface may be frustro-conical or one or more planar surfaces. Where planar surfaces are utilized, the cutting edges are linear. Where frustro-conical surfaces are utilized, the cutting edge is circular. A plurality of coolant flow orifices are provided to allow the flow of coolant on one or both of the flank surface and cutting surface. Chip flow grooves may be provided on the cutting surface to guide and/or break chips during the cutting operation. Lobes may be provided on the flank surface to provide a constant flank angle during the cutting operation.

68 Claims, 32 Drawing Figures

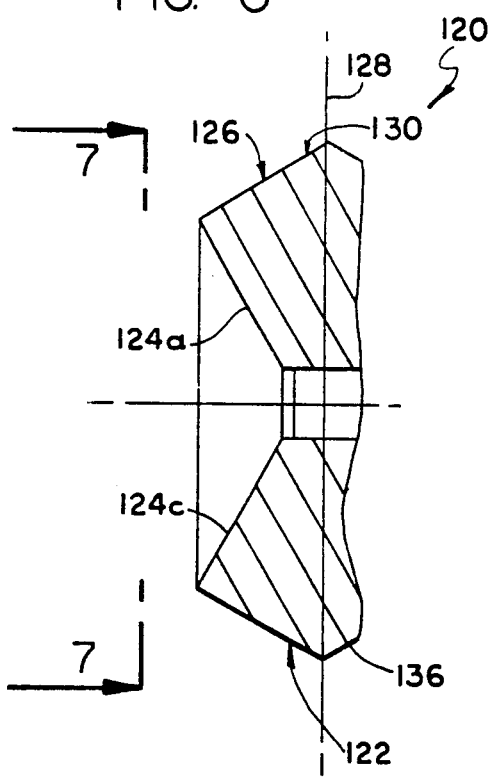
FIG. 6
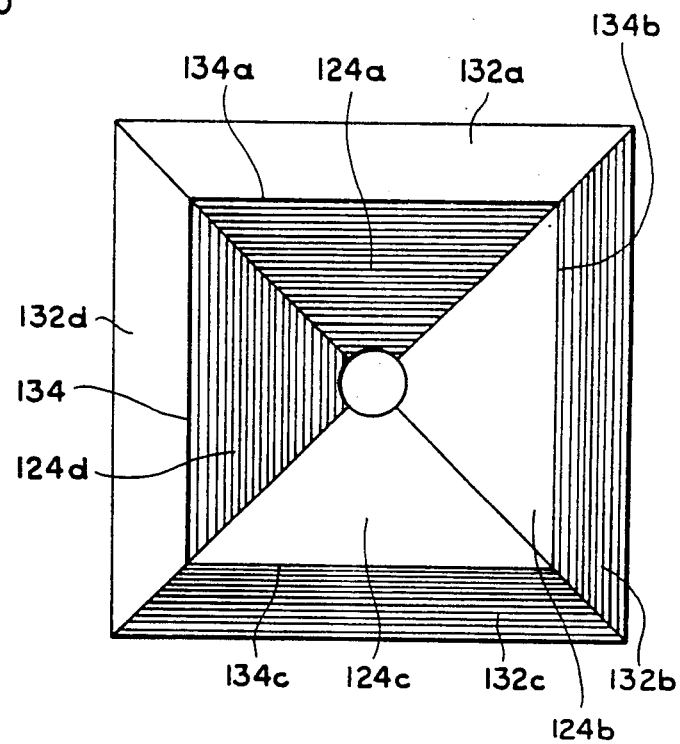
FIG. 7
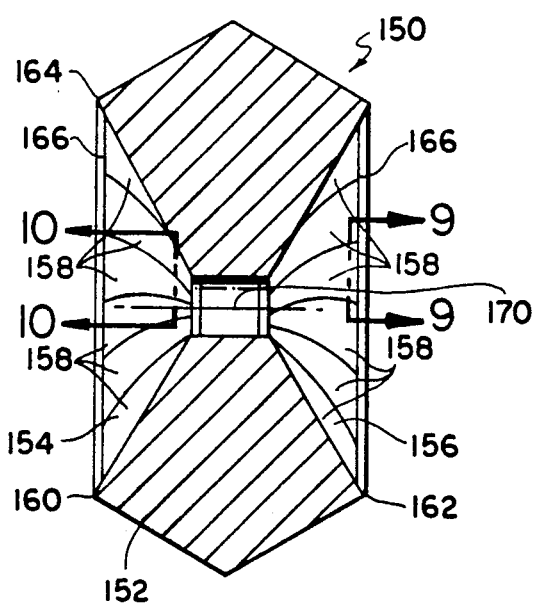
FIG. 8
FIG. 9
FIG. 10

FIG. 30
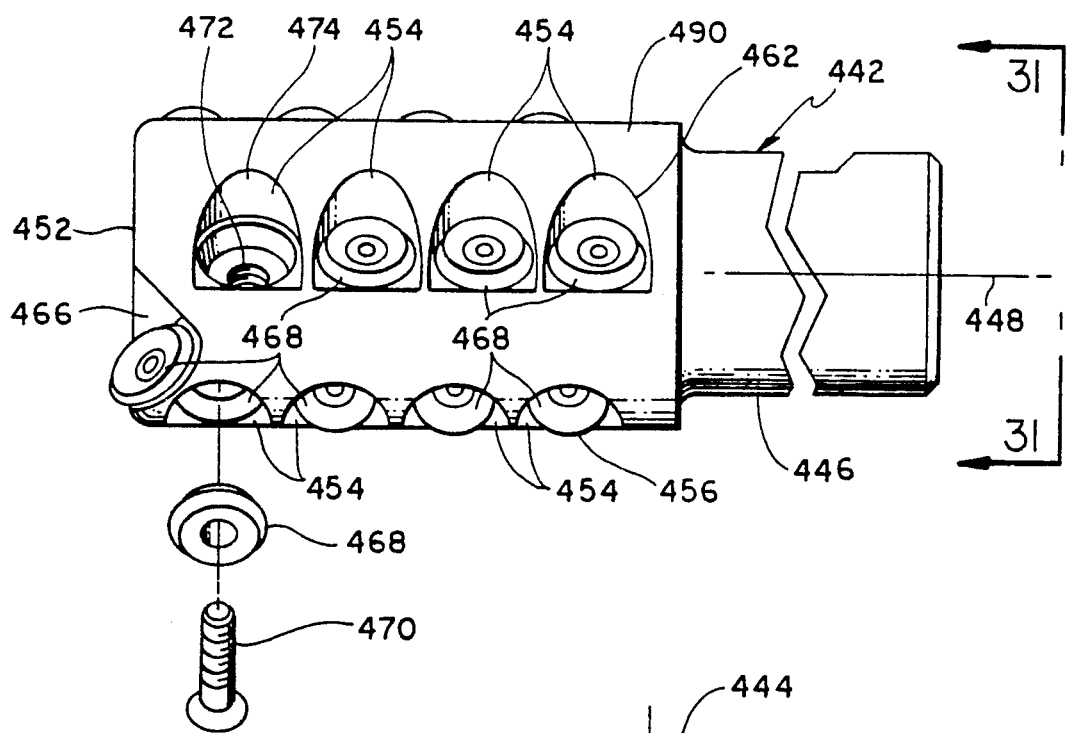
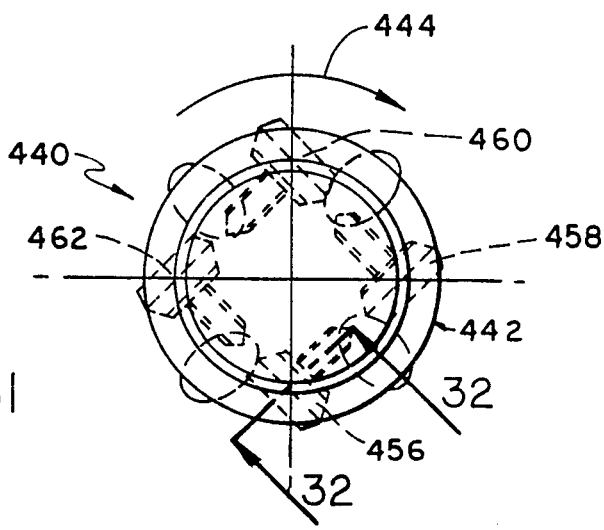
FIG. 31
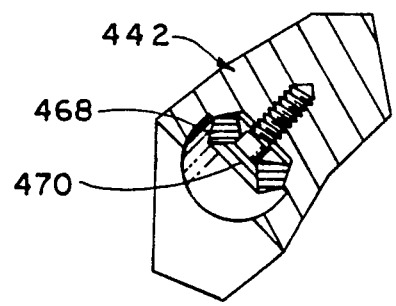
FIG. 32

CUTTING INSERT ARRANGEMENT

This application is a division of U.S. patent application Ser. No. 600,806, filed Apr. 16, 1984, now U.S. Pat. No. 4,621,955, issued Nov. 11, 1986.

BACKGROUND OF THE INVENTION

1. Field of the Invention

The present invention relates to the materials shaping and forming art, and, more particularly, to an improved cutting insert for fixed or rotary cutting tool operations.

2. Description of the Prior Art

Cutting inserts are utilized in a variety of material forming applications such as milling machines, lathes, shavers, and the like. In such applications the cutting insert is mounted on a tool body and the cutting edge of the cutting insert moves relative to the workpiece to remove a predetermined amount of material therefrom. The cutting insert may rotate relative to the workpiece, or may be non-rotating relative to the workpiece. Cutting inserts heretofore utilized have generally been cylindrical discs, in which a peripheral edge of the disc is utilized as the cutting edge. However, triangular, rectangular, or other geometric configurations of cutting tools have also been utilized.

The forces imposed upon the cutting insert during the cutting operation depend, of course, upon the relative speed of the cutting, the geometry of the cutting edge of the cutting insert with respect to the workpiece from which the material is being removed, and the material from which the workpiece is fabricated. Such factors as positive rake, negative rake, in both the radial and axial directions with respect to the cutter, the lead angle, and the like, all influence the total cutting force. In the general case, where there is a relative rotation between the workpiece and the cutting tool, as well as the relative longitudinal movement therebetween, the total force imposed upon the cutting insert is equivalent to the square root of twice the sum of the tangential force, radial force, and axial force imposed on the cutting tool. This force is applied to the cutting insert, and, in turn, is transmitted to the cutting insert holder in the tool utilizing the cutting insert. Depending upon the material being cut and other factors, as mentioned above, the force thus imposed upon the cutting insert can become quite large. When the cutting force exceeds the minimal sectional strength of the cutting insert, failure of the tool results. Consequently, depending upon the geometry, in many applications comparatively low cutting speeds and thin cuts may be all that the particular cutting insert can withstand. It is, of course, generally desirable to be able to have the capability of making as large a cut as rapidly as possible in order to minimize the total time of operation.

Cutting tools such as those shown in U.S. Pat. Nos. 1,542,007; 1,577,952; and 1,838,520 have generally not been able to withstand comparatively high cutting forces because of the particular geometry of the cutting edge of the cutting insert with respect to the workpiece and the load absorbing capability of the mounting structure of the cutting insert. The cutting tool shown in U.S. Pat. No. 4,213,358, which illustrates a rotating cutting tool, has the disadvantage of having a comparatively unsupported, narrow section adjacent the cutting edge, which limits the total force which may be applied to the cutting insert shown therein. This tends to limit the application of such a cutting insert.

Accordingly, there has long been a need for an improved cutting insert which is capable of withstanding comparatively high cutting forces without deterioration or degradation of the cutting insert or the mounting thereof, and to withstand such high cutting forces over comparatively long periods of time in order to provide a greater cutting insert life.

SUMMARY OF THE INVENTION

It is an object of the present invention to provide an improved cutting insert.

It is another object of the present invention to provide an improved cutting insert which is comparatively inexpensive to fabricate.

It is another object of the present invention to provide an improved cutting insert capable of withstanding comparatively high cutting forces over extended periods of time.

It is another object of the present invention to provide an improved cutting insert having an extended operational life when utilized in applications involving high cutting forces imposed thereon.

It is another object of the present invention to provide an improved cutting insert which may be mounted to provide the desired type of rake associated with the particular cutting operation.

The above and other objects of the present invention are achieved, according to preferred embodiments thereof, by providing a body member which has an outer peripheral surface, a central axis, a median plane substantially perpendicular to the central axis, and a first end section extending in a first direction from the median plane and a second end section extending in a second direction opposite the first direction from the median plane.

The first end section has a first inner cutting surface which tapers outwardly from regions adjacent the central axis and median plane toward the outer peripheral surface. The first inner cutting surface may be frusto-conical or, alternatively, may be planar or comprised of a plurality of planar inner cutting surfaces. The outer peripheral surface in the first end section defines a first flank surface which tapers inwardly from regions adjacent the median plane toward the central axis. The flank surface may be frusto-conical when the inner cutting surface is frusto-conical, or, alternatively, may be one or more planar sections to match the planar sections of the first inner cutting surface, or, in certain embodiments, may comprise a doubly curved surface in these embodiments wherein radial and axial adjustment of the insert is desired.

The intersection of the first flank surface with the first inner cutting surface defines a first cutting edge. In, for example, the embodiments where the first inner cutting surface and the first flank surface are frusto-conical, the first cutting edge is circular. In embodiments where the first inner cutting surface and the first flank surface are planar, the first cutting edge is linear and may be one or more linear segments.

The cutting insert thus described in this embodiment has a constantly increasing thickness from the first cutting edge toward the median plane.

The cutting insert is mounted in a tool holder. In some preferred embodiments of the present invention, the tool holder engages the second end section of the body member and, preferably, engages the outer peripheral surface of the second end sections in regions adjacent the median plane. Such a mounting arrangement is preferred so that the cutting forces imposed upon the first cutting edge are transmitted through the body of the cutting member to the tool holder. As a result, since there is an absence of comparatively thin sectioned portions of the body member subjected to the cutting forces, comparatively longer life during subjection to higher cutting forces is achieved and higher cutting speeds and thicker cuts may thereby be made by the cutting insert of the present invention. The large mass of the present cutting insert in the region of the cutting edge provides another significant advantage. The larger mass is more effective in dissipating the heat generated during the cutting operation, whether or not coolant flow is provided. This provides increased operational life, less thermal deformation to the cutting edge, and results in a smooother finish to the cut surface.

Many other preferred mounting arrangements for the cutting insert of the present invention may be utilized. The particular type of mounting arrangement desired for particular application may, in part, dictate the geometry of the cutting insert.

In another embodiment of the present invention, the second end section is substantially identical to the first end section, as above described, and, therefore, the cutting insert is "reversible": that is, when the first cutting edge becomes dull, the cutting insert may be removed from the tool holder and reversed and, thereafter, the second cutting edge of the second end section utilized. The particular mounting configuration is adapted to match the configuration of the end sections of the particular cutting insert utilized.

In other embodiments of the present invention, a plurality of coolant orifices may be provided through the body member. A first plurality may, if desired, be positioned in regions adjacent the median plane and extend through the flank surface for cooling the flank surface. A second plurality of coolant flow orifices may be provided in regions adjacent the central axis and extend through the inner cutting surface to allow the flow of coolant during operation to cool the inner cutting surface.

In yet other embodiments of the present invention, chip flow grooves may be provided on the inner cutting surface in a generally helical configuration, to guide the chip flow during the cutting operation and thereby control the position of the chips as well as breaking the chips at a predetermined length thereof. The chip flow groove provides additional advantages in those embodiments of the present invention utilizing a rotating cutting insert. The force of the chip flowing in the grooves provides additional rotational force to the cutting insert to prevent "skidding," that is, movement of the cutting insert on the workpiece without rotation. This results in better cut surface finish and insures positive rotation of the cutting insert in a greater range of insert-workpiece geometries.

Additionally, in yet other embodiments of the present invention, wherein the inner cutting surface and outer flank surface are frusto-conical, lobes may be provided on the flank surface to provide a substantially constant flank angle for a particular geometry of cutting insert mounting with respect to the workpiece.

It has been found that cutting inserts in accordance with the principles of the present invention provide better chip control and less induced wear and vibration. The chips formed during the cutting operation tend to be driven toward the center line of the insert. Therefore, there is minimal thrust load on the insert tending to "unseat" the insert. As a result, there is less wear and therefore reduced tendency for vibration of the insert as well as reduced forced vibrations transmitted to the supporting structure and the workpiece. Reduced vibration, it has been found, also provides a smoother finish on the workpiece during the cutting operation.

BRIEF DESCRIPTION OF THE DRAWINGS

The above and other embodiments of the present invention may be more fully understood from the following detailed description, taken together with the accompanying drawings, wherein similar reference characters refer to similar elements throughout, and in which:

FIG. 6 illustrates another embodiment of the present invention;

FIG. 7 is a view along the line 7—7 of FIG. 6;

FIG. 8 illustrates another embodiment of the present invention;

FIG. 9 is a partial, sectional, view along the sectional line 9—9 of FIG. 9;

FIG. 10 is a partial, sectional, view along the line 10—10 of FIG. 8;

FIG. 30 illustrates another embodiment of the present invention;

FIG. 31 is an end view along the view line 31—31 of FIG. 30; and

FIG. 32 is a partial sectional view along the line 32—32 of FIG. 31.

DESCRIPTION OF THE PREFERRED EMBODIMENTS

Figure 1:
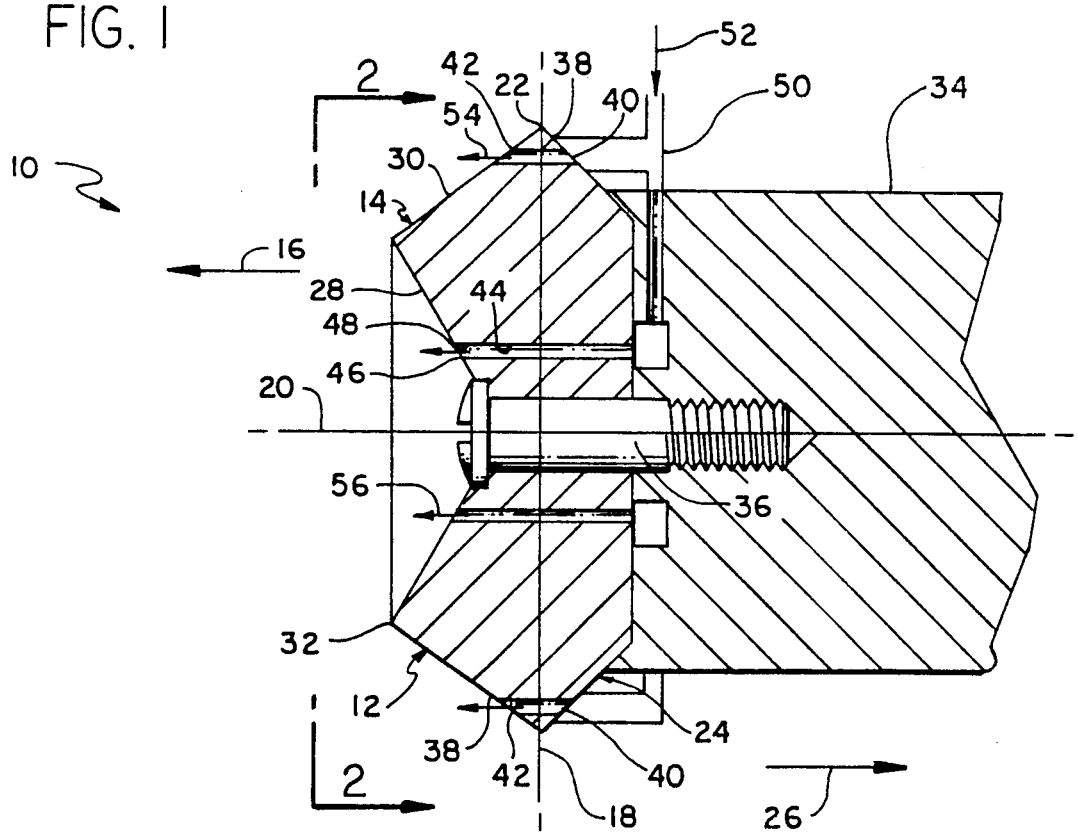
FIG. 1 illustrates a preferred embodiment of the present invention.
Figure 2:
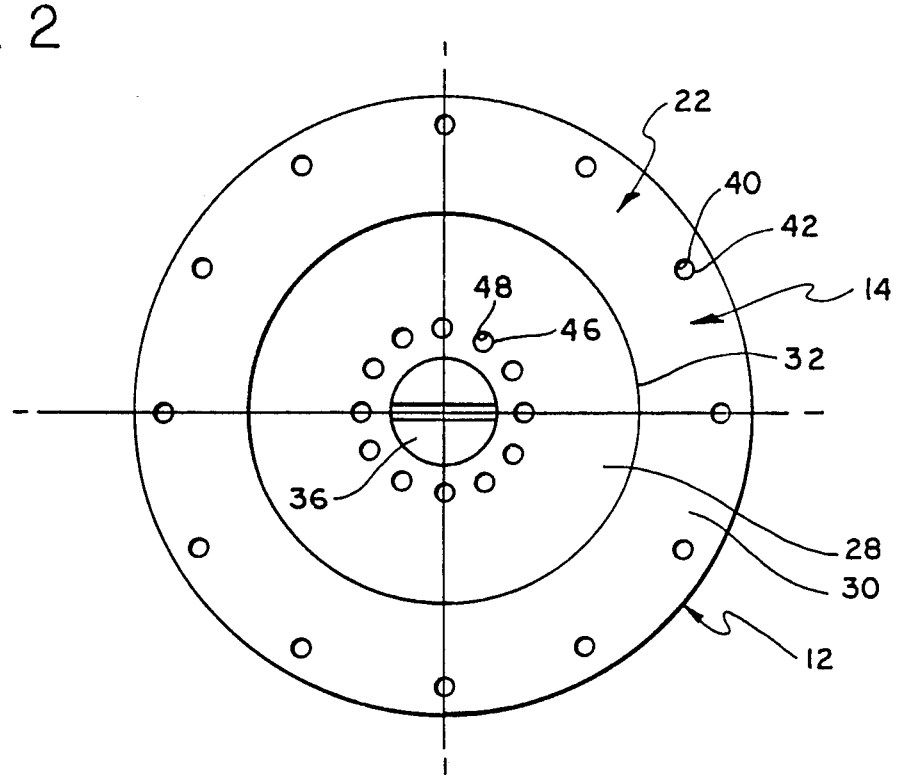
FIG. 2 is a view along the line 2—2 of FIG. 1.

Referring now to the drawing, there are illustrated the preferred embodiments of the present invention. As described herein, the cutting insert of the present invention is illustrated in non-rotating cutting insert applications, and in rotating cutting insert applications. It will be appreciated that the description of the present invention is not limiting to the invention herein. Those skilled in the art can readily adapt the mounting of the cutting insert of the present invention to both rotating and non-rotating configurations, as may be required in particular applications.

Referring now to FIG. 1, there is illustrated one embodiment, generally designated 10, of the present invention. In embodiment 10 there is provided a body member 12, having a first end section generally designated 14, extending in a first direction indicated by the arrow 16, from a median plane 18. The body member 12 has a central axis 20 and an outer peripheral surface generally designated 22. The median plane 18 is substantially perpendicular to the central axis 20. The body member 12 also has a second end section generally designated 24, extending in a second direction, indicated by the arrow 26 from the median plane 18, opposite the first direction indicated by the arrow 16.

The first end section 14 has a first inner cutting surface generally designated 28. In the embodiment 10, the first inner cutting surface 28 is frusto-conical and tapers outwardly from regions adjacent the median plane 18 to the outer surface 22.

The outer peripheral surface 22, in the first end section 14, defines a first outer flank surface, generally designated 30, which tapers inwardly from regions adjacent the median plane 18, toward the central axis 20. The intersection of the first outer flank surface 30 with the first inner cutting surface 28, defines the first cutting edge 32. The first cutting edge 32 is utilized in the embodiment 10 to provide the cutting for removing material from a workpiece (not shown).

In the embodiment 10, the body member 12 is mounted in a tool holder 34 by a screw means 36, extending through the body member 12, coaxially with the central axis 20. The tool holder 34 engages the outer peripheral surface 22 at the second end section 24.

As can be seen, when cutting forces are imposed upon the cutting edge 32 during a cutting operation, the forces are transmitted to the tool holder. The constantly increasing thickness of the body member 12 from the cutting edge 32 toward the median plane 18, provides increased strength and aids in transmitting the full cutting forces directly to the tool holder 34, as well as providing greater thermal dissipation. It has been found that such a configuration tends to eliminate wear and minimize vibration in the mounting arrangement which tends to cause "chatter." In prior art cutting inserts, the wear associated with the mounting of the cutting insert has resulted in chatter, which tends to minimize the operational life of the cutting insert as well as providing comparatively rough surfaces on the workpiece left after the cut. The present invention, however, tends to eliminate chatter and vibration, and thereby provides cutting with a higher degree of smoothness to the workpiece for extended periods of time.

If desired, the body member 12 may be provided with first walls 38, defining a first plurality of coolant orifices 40, extending through the body member 12 in regions adjacent the median plane 18 and having an aperture 42 on the first flank surface 30 to allow the flow of coolant over the first flank surface 30 during the cutting operation. Similarly, body member 12 may be provided with second walls 44 defining a second plurality of coolant flow orifices 46 through the body member 12, having apertures 48 in the first cutting surface 28 in regions adjacent the central axis 20, to allow the flow of coolant fluid along the first cutting surface 28 during the cutting operation. The coolant flow is provided through a manifold structure 50 in which coolant flows in a direction indicated by the arrow 52 and out of the coolant flow orifices as indicated by the arrows 54 and 56.

Figure 3:
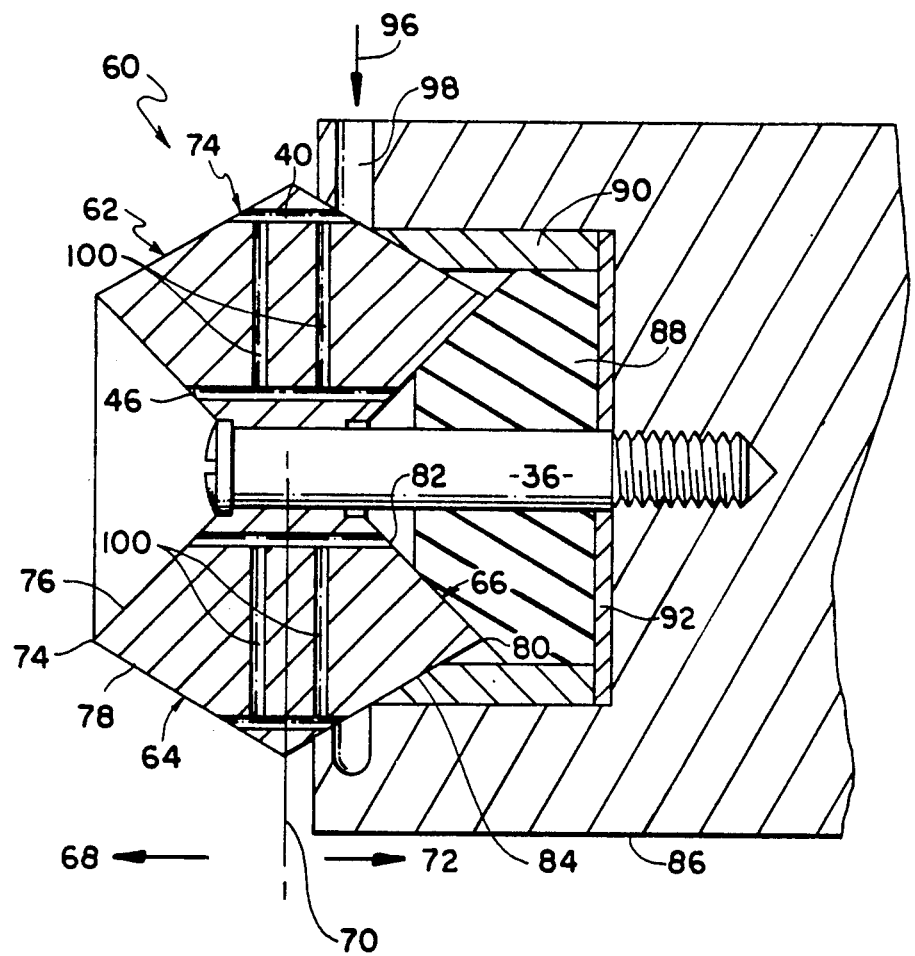
FIG. 3 illustrates another embodiment of the present invention.
Figure 29:
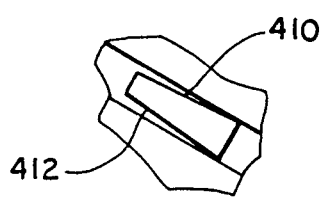
FIG. 29 is a view along the view line 29—29 of FIG. 27.

In the embodiment 10, it will be appreciated, the body member 12 is not "reversible." That is, only the first end section 14 provides a first cutting edge 32, and the second end section 24 is utilized for mounting the body member 12 in the tool holder 34. However, in other embodiments of the present invention, the body member may be symmetrical about the median plane. FIG. 3 illustrates such an embodiment. As shown on FIG. 29 the embodiment 60 is comprised of a body member 62, having a first end section 64 and a second end section 66. The first end section 64 extends in a first direction indicated by the arrow 68 from the median plane 70 and the second end section 66 extends in a second direction, indicated by the arrow 72 from the median plane 70. In the embodiment 60, each of the first end section 64 and second end section 66 may be substantially identical to the first end section 14 of the embodiment 10 described above, and thus the body member 62 is symmetrical about the median plane 70 and has a first cutting edge 74 defined by the first inner cutting surface 76 thereof intersecting with the first flank surface 78 thereof. Similarly, the second end section 66 has a second cutting edge 80, defined by the intersection of the second cutting surface 82 and second flank surface 84.

The body member 62 of embodiment 60 is mounted in a tool holder 86. To provide the mounting of the body member 62 in the tool holder 86, there is provided a rubber leveling pad 88 which bears against the second inner cutting surface 82 to provide mounting alignment of the body member 62 and a bushing seat 90 engages the second flank surface 84 for providing precise alignment of the body member 62 in the tool holder 86. A shim 92 may be utilized, if required, for proper positioning. A screw means 36 is utilized to hold the body member 62 in the tool holder 86.

Coolant flow means, generally designated 94, are provided in the body member 62 and are generally similar to the coolant flow means described above in connection with the embodiment 10, and comprising the coolant flow orifices 40 and 46, and allows the flow of coolant as indicated by the arrow 96 through a manifold 98. However, to provide the symmetrical arrangement of 26 the embodiment 60, additional transfer passages 100 are provided to allow the flow of coolant through all of the desired coolant flow orifices.

In the embodiments 10 and 60 described above, the inner cutting surface and outer flank surface were frusto-conical. However, the principles of the present invention may also be utilized in a cutting insert wherein the inner cutting surface and outer flank surface are planar. Further, there may be a plurality of such planar surfaces.

Figure 4:
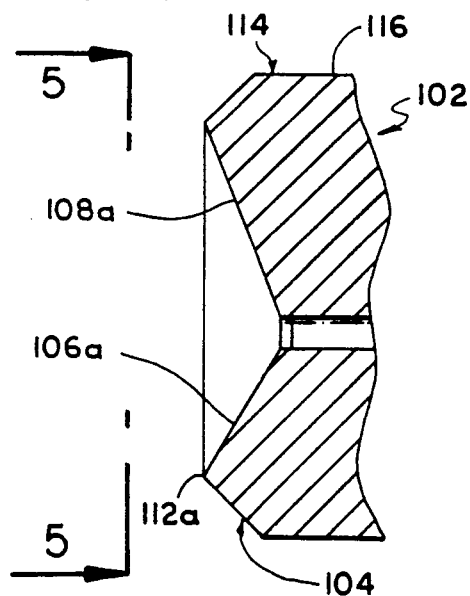
FIG. 4 illustrates another embodiment of the present invention.
Figure 5:
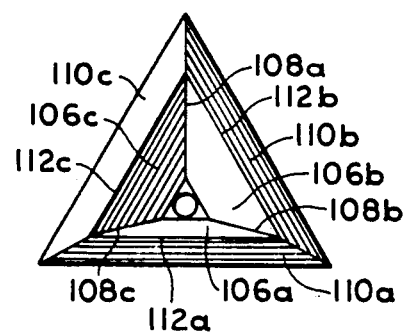
FIG. 5 is a view along the line 5—5 of FIG. 4.
Figure 11:
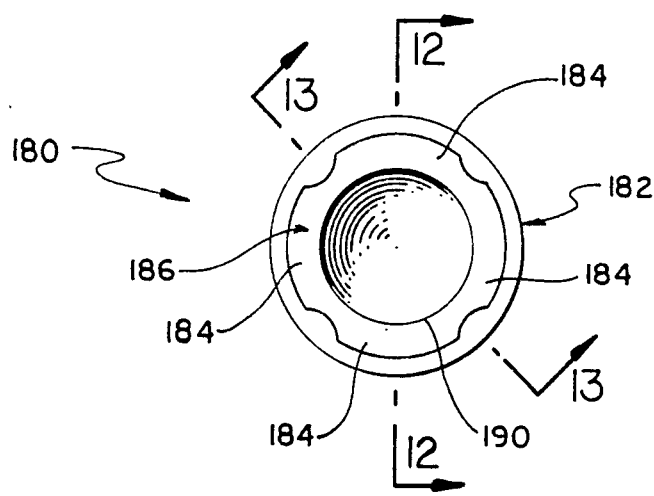
FIG. 11 illustrates another embodiment of the present invention.
Figure 12:
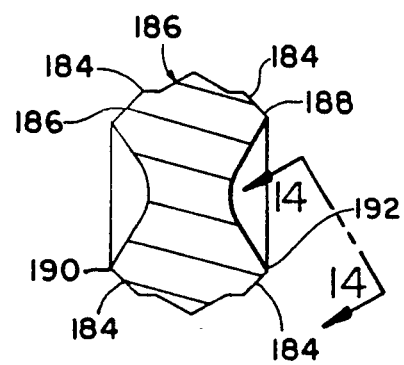
FIG. 12 is a sectional view along the line 12—12 of FIG. 11.
Figure 13:
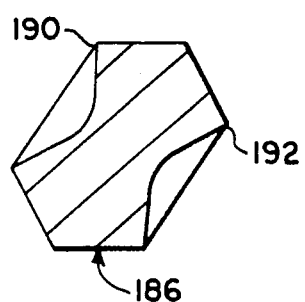
FIG. 13 is a sectional view along the line 13—13 of FIG. 11.
Figure 14:
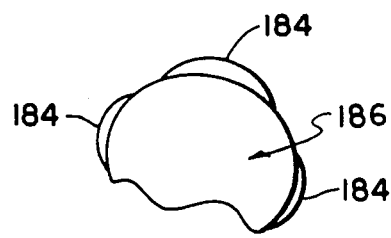
FIG. 14 is a view along the line 14—14 of FIG. 12.

FIGS. 4 and 5 illustrate an embodiment generally designated 102, in which the body member 104 is generally triangular in shape. In FIG. 4, the body member 104 has a plurality of three planar inner cutting surfaces 106a, 106b, and 106c, which intersect along the lines 108a, 108b and 108c.

Planar outer flank surfaces 110a, 110b, and 110c, are provided on the body member 104, and the intersection thereof with the inner cutting surfaces, provides the cutting edges 112a, 112b, and 112c. If desired, coolant flow orifices, such as those described above in connection with embodiments 10 and 60 of the present invention, may be provided. Similarly, the embodiment 102 may have only a first end section 114 providing cutting edges, with the second end section 116 merely providing a mounting surface, similar to the embodiment 10 described above, or, alternatively, the second end section 116 of the embodiment 102 may be identical to the first end section 114 in a manner similar to the embodiment 60 described above to provide a reversible cutting insert.

FIGS. 6 and 7 illustrate another embodiment, generally designated 120, in which the body member 122 is generally rectangular in shape and is thus provided with four inner cutting surfaces 124a, 124b, 124c, and 124d, on a first end section 126 thereof, extending from the median plane 128. The outer peripheral surface 130, of the body member 122, may also be provided with four planar outer flank surfaces 132a, 132b, 132c, and 132d, which intersect with the inner planar cutting surfaces to provide the cutting edges 134a, 134b, 134c, and 134d. If desired, of course, coolant flow orifices may be provided in the body member 122. Similarly, the second section 136 of the body member 122 may provide just mounting configuration similar to the mounting configuration illustrated in connection with the embodiment 10 described above, or it may provide a second plurality of cutting edges by being identical to the first section 126 and thereby symmetrical about the median plane 128, similar to the embodiment 60, described above.

FIGS. 8, 9, and 10 illustrate another embodiment, generally designated 150, of the present invention. In the embodiment 150, the body member 152 may be of the single cutting edge configuration as illustrated in the embodiment 10, or as illustrated in FIGS. 8 and 9, may be of the double cutting edge configuration, similar to the embodiment 60. Thus, the structural elements of the embodiment 150 of FIGS. 8, 9, and 10 are shown as incorporated in a reversible cutting insert, similar to the embodiment 60. The features of embodiment 150 are applicable to any of the embodiments of the present invention, and may be advantageously incorporated therein. The body member 152 of embodiment 150 is generally similar to the body member 62 of embodiment 60. In the embodiment 150, the first inner cutting surface 154 and the second inner cutting surface 156 are provided with a plurality of chip flow grooves, generally designated 158. Further, both the first cutting edge 160 and second cutting edge 162 are at the extremity of a land surface segment portion 164 of the first and second inner cutting surfaces 154 and 156. The chip flow grooves extend from the inner land edge 166 to the regions adjacent the central axis 170. The chip flow grooves may extend linearly, or, as shown in FIGS. 8, 9, and 10, may be helical. It has been found that the helical chip flow grooves not only tend to direct the flow of the chips, but also tend to break the chips at predictable points because of the helical path. Further, the chip flow grooves 158 may be of uniform depth, or they may taper and gradually increase in depth, having the shallowest depth in regions adjacent the inner land edge 166, and increasing in depth therefrom. Alternatively, the chip flow grooves may have the shallowest depth adjacent the inner land edge 166 and progressively deeper toward the central axis 170. As noted above, the chip flow grooves 158 may be incorporated in any embodiment of the present invention. Similarly, oil coolant orifices may be incorporated in the embodiment 150 in a manner as described above in connection with embodiments 10 and 60.

In embodiments of the present invention utilizing frusto-conical inner cutting surfaces and outer cutting surfaces, it has also been found advantageous for certain applications to incorporate lobes on the flank surface of the body member. Such lobes may be shaped and positioned to provide a constant flank angle of the cutter insert with respect to the workpiece, thereby providing the optimum cutting configuration throughout that portion of a cutting edge which is in contact with the workpiece. Such an embodiment is illustrated generaly as embodiment 180 in FIGS. 11, 12, 13, and 14. The cutting insert of embodiment 180 comprises a body member generally designated 182, which, for example, may be similar to the embodiments 10 or 60 described above, in that there may be a single edge cutting insert or a double edge cutting insert and is of the type having frusto-conical surfaces for the inner cutting surface and the outer flank surface. As illustrated from the embodiment 180, a plurality, and as illustrated, the plurality is four, lobes 184 on the outer peripheral surface 185, and, as shown, there are four such lobes 184 on each of the first end section 186 and second end section 188. The lobes extend to the cutting edges 190 and 192. The lobes 184 provide a substantially constant flank angle to improve cutting operation, and gives added structural support to the cutting edges 190 and 192.

In the embodiments of the present invention wherein they are utilized in applications of a non-rotating cutting insert, it will be appreciated that the cutting insert may be loosened from its mounting tool by, for example, loosening the mounting screw means 36 illustrated in the embodiment 10 and embodiment 60, and rotating it a desired number of degrees to provide a fresh cutting edge. Further, in those embodiments wherein there is provided a reversible cutting insert, after the entire cutting edge on one end section has become dull, the cutting insert may be reversed and the new cutting edge utilized.

Figure 15:
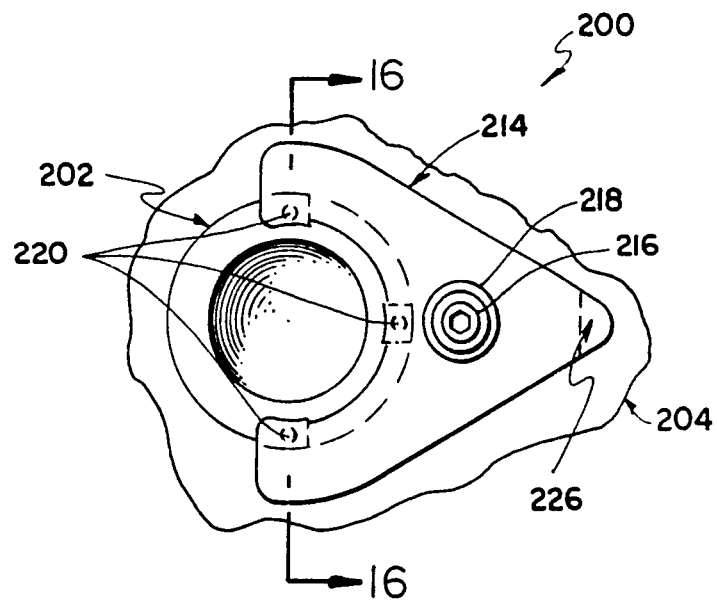
FIG. 15 illustrates another embodiment of the present invention.
Figure 16:
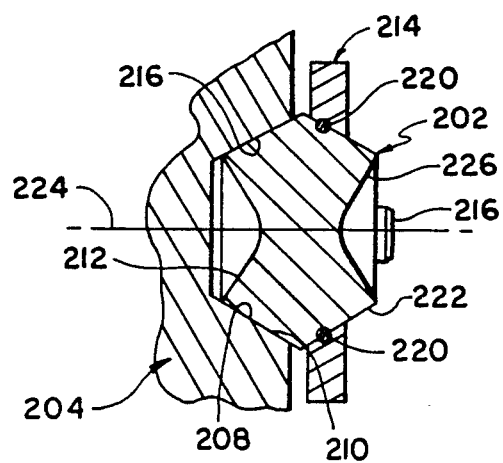
FIG. 16 is a sectional view along the line 16—16 of FIG. 15.

In some applications of the present invention, it may not be desirable to provide a central bore through the cutting insert for mounting the cutting insert in an appropriate tool mounting means. FIG. 15 illustrates a front view of an embodiment generally designated 200, of the present invention, in which there is provided a cutting insert 202, which, as illustrated in the embodiment 200 is generally similar to the cutting insert 64 shown in FIG. 3, except that no central aperture for a mounting screw is provided therein. It will be appreciated that both a reversible cutting insert and a cutting insert having a single cutting edge, such as the cutting insert illustrated in the embodiment 10, described above, may be utilized in the embodiment 200. The cutting insert 202 is mounted in a tool holder 204 which has a tapered mounting surface 206, matching the tapered outer surface 208 of the outer peripheral surface 210 of the cutting insert 202 in the second end section 212 thereof.

A clamping means 214 is mounted on the tool holder means 204 by a clamp screw 216 and washer 218. The clamping means 214 has three clamping surfaces, generally indicated at 220, which engage the tapered outer peripheral surface 222 of the first end 226 of the cutting insert 202. Tightening of the clamp screw 216 forces the clamping means 214 toward the cutting insert 202, thereby clamping the cutting insert 202 between the clamping means 214 and the tool holder 204. In the embodiment 200, it will be appreciated, the cutting insert 202 may be rotated about the central axis 224 thereof, to provide a different portion of the cutting edge for cutting by loosening the clamp screw 216 and rotating the cutting insert 202 as desired, and then tightening the clamp screw. Further support may be provided between the clamping means 214 and the tool holder 204 by a support foot, indicated generally at 226. The embodiment 200, as described above, thus provides three point clamping of the cutting insert 202 for firm retention in the tool holder 204.

Figure 17:
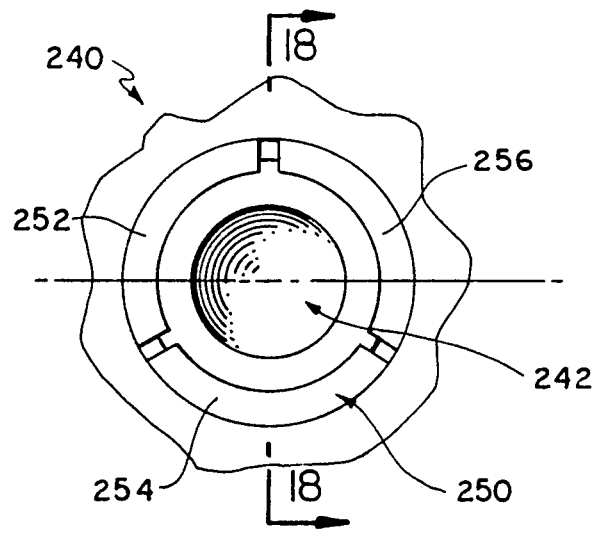
FIG. 17 illustrates another embodiment of the present invention.
Figure 18:
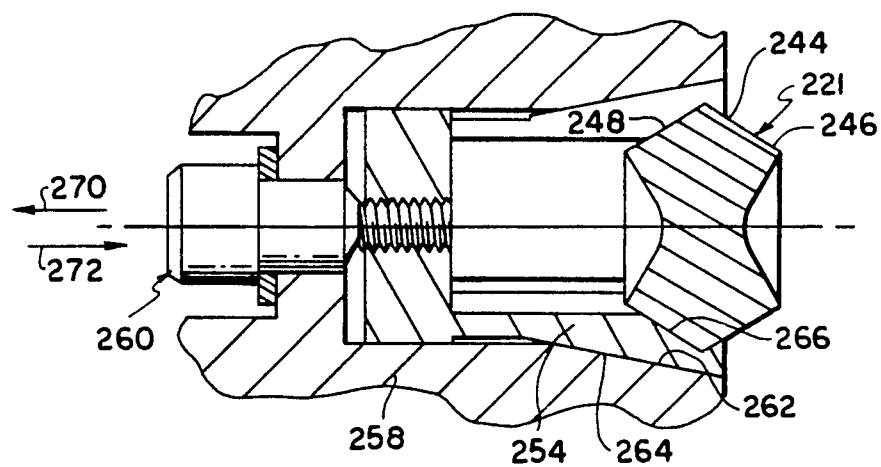
FIG. 18 is a sectional view along the line 18—18 of FIG. 17.
Figure 19:
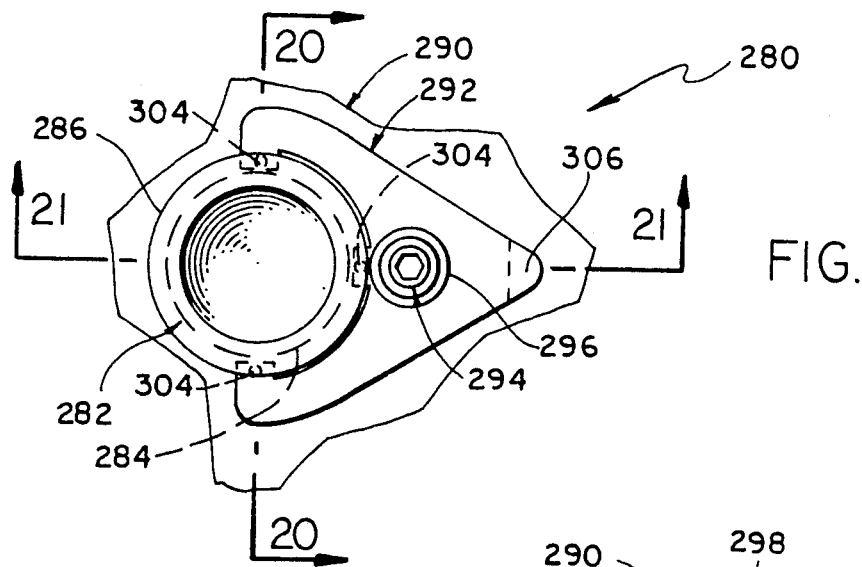
FIG. 19 illustrates another embodiment of the present invention.
Figure 20:
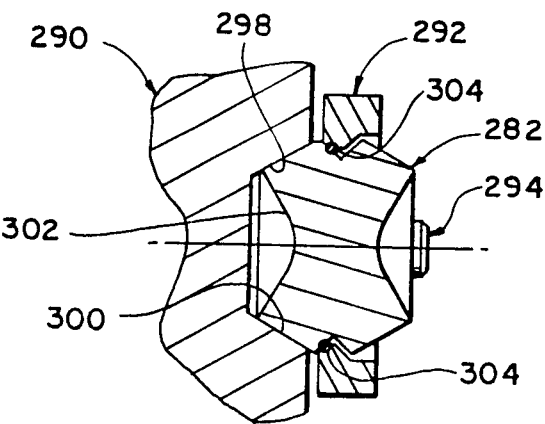
FIG. 20 is a sectional view along the line 20—20 of FIG. 19.
Figure 21:
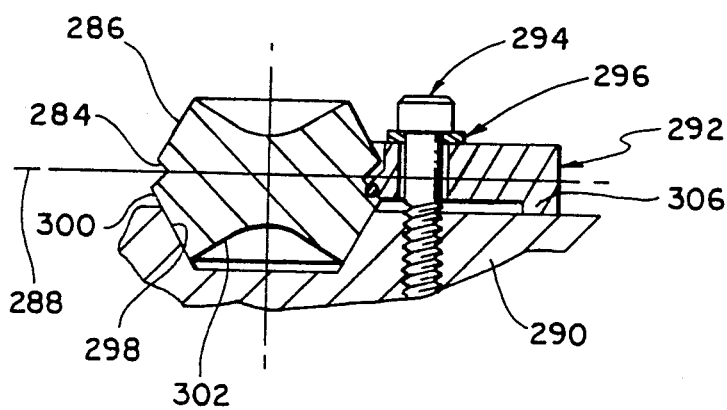
FIG. 21 is a sectional view along the line 21—21 of FIG. 19.

FIGS. 17 and 18 illustrate another embodiment of the present invention, generally designated 240, for mounting a cutting insert of the present invention. As illustrated in FIGS. 17 and 18, in embodiment 240, a cutting insert, generally designated 242, which may be similar to the cutting inserts described above, for example, in the embodiments 10 and 60, is provided and, as described above, has an outer peripheral surface 244 in both a first end section 246 and a second end section 248 thereof. A collet means 250 is provided and the collet means 250, as illustrated in embodiment 240, has three jaws 252, 254 and 256.

The collet means 250 is mounted in a tool holder means 258 by means of a clamp screw 260. As can be seen, each of the three jaws, 252, 254, and 256, have outer surfaces 262 bearing against and slidably movable on tapered surfaces 264 of the tool holder means 258. The clamping jaws each have inner surfaces 266 which clampingly engage the outer peripheral surface 244 in the first end section 246 and second end section 248 of the cutting insert 242.

As can be seen, tightening of the clamp screw 260, which comprises means for retaining the collet 250 in the tool holder 258, moves the collet in a first direction indicated by the arrow 270 which forces the clamping jaws 252, 254, and 256 toward each other, thereby clampingly engaging and retaining the cutting insert 242. Similarly, loosening of the clamp screw 260 moves the collet 250 in a second direction indicated by the arrow 272, opposite the first direction, thereby loosening the clamping jaws 252, 254, and 256 from the cutting insert 242 to allow rotation thereof, reversal thereof, or removal thereof.

Another mounting arrangement for the improved cutting insert of the present invention is illustrated in FIGS. 19, 20, 21, and 22. In this embodiment, generally designated 280, there is provided a conical cutting insert 282, generally similar to the cutting insert illustrated in the embodiment of FIG. 200, and thus may be of the type shown in the embodiments 10 or 60. However, in the cutting insert 282, there is provided first walls 284 in the outer peripheral surface 286 and the first walls 284 define a mounting groove extending peripherally around the cutting insert 284, in regions adjacent the median plane 288. In the embodiment 280, there is provided a tool holder 290, on which there is mounted a clamping means 292, secured to the tool holder 290 by a clamp screw 294, which extends through the clamping means 292, bearing on washer 296, and threadingly engages the tool holder 290.

The tool holder means 290 has a bearing surface 298, which bears upon the tapered outer peripheral surface 300 of the second end section 302 of the cutting insert 282.

The clamping means 292 has a clamping surface means generally designated 304, which, in the embodiment 280 comprises three separate clamping surface pads which engage the first walls 284, defining the "V" shaped peripheral groove in the cutting insert 282.

Tightening of the clamp screw 294 clamps the cutting insert 282 between the clamping surface means 304 of the clamping means 292 and the bearing surface 298 of the tool holder 290 for releasably retaining the cutting insert 282 on the tool holder 290.

Figure 22:
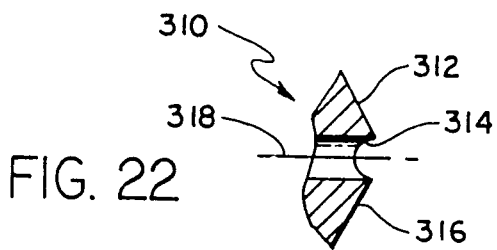
FIG. 22 illustrates another embodiment of the present invention.

In another embodiment, generally designated 310, as illustrated in FIG. 22, the cutting insert 312 is generally similar to the cutting insert 282 described above, except that the first walls 314 thereof define a generally "U" shaped groove on the outer peripheral surface 316 at the median plane 318, as compared with the generally "V" shaped groove defined by the first walls 284 in the cutting insert 282.

Figure 23:
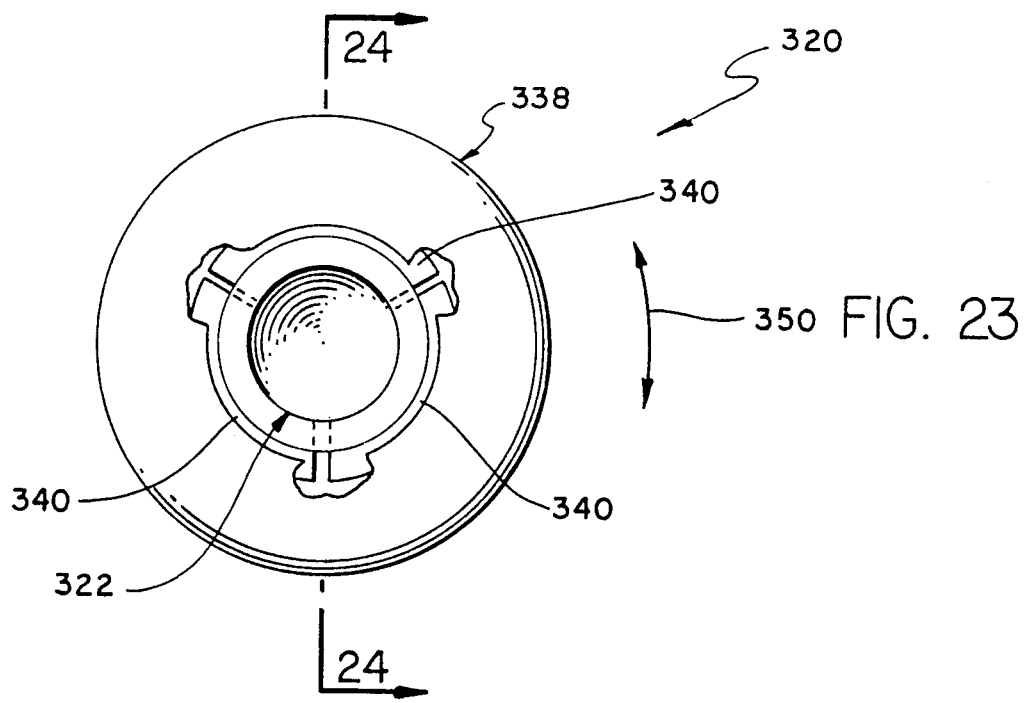
FIG. 23 illustrates another embodiment of the present invention.
Figure 24:
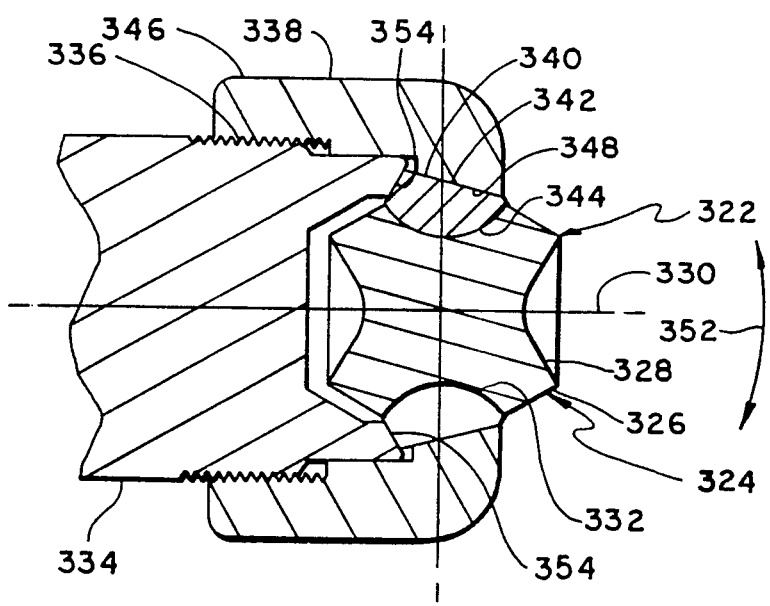
FIG. 24 is a sectional view along the line 24—24 of FIG. 23.

In other embodiments of the present invention, it may be desirable in the mounting of the cutting insert, to provide multi-axis adjustment capability. FIGS. 23 and 24 illustrate an embodiment generally designated 320 having multi-axis adjustment capability in the mounting thereof. As shown in FIGS. 23 and 24, in the embodiment 320 there is provided a conical cutting insert, generally designated 322 in accordance with the principles of the present invention. The cutting insert 322 is generally similar to, for example, the cutting insert illustrated in the embodiment 60 described above. However, in the cutting insert 322, the outer peripheral surface, generally designated 324 has a first portion 326 in the first end 328 thereof, tapering inwardly toward the center line 330. A mounting surface portion, generally designated 332, of the outer peripheral surface 324, defines a concave, doubly curved mounting surface.

In mounting the cutting insert 322, there is provided a mounting means comprising a tool holder means generally designated 334, which threadingly engages, at 336, a clamping nut 338. A plurality, in embodiment 320, the plurality is three, of separate jaw segments 340 are positioned in the concave, doubly curved mounting surface 332 of the cutting insert 322, and each of the jaw segments 340 has an outer surface 342 and an inner surface 344. The inner surface 344 is a doubly curved spherical segment matching the doubly curved concave mounting surface 332 of the insert 322.

The clamping nut 338 has a first section generally designated 346 for threading engagement at 336 with the tool holder 334. The clamping nut 338 has a second section, generally designated 348 for engaging the plurality of jaw segments on the outer surface 342 for releasably retaining the cutting insert 322. As can be seen, tightening of the threading engagement 336 between the clamping nut 338 and the tool holder 334 clamps the cutting insert 322 because of the engagement of the clamping nut 338 with the jaw segments 340.

As noted above, the mounting arrangement illustrated in the embodiment 320 provides multi-axis adjustment. That is, by loosening the clamping nut 338, the cutting insert 322 may be rotated in the directions indicated by the arrows 350, as illustrated in FIG. 23, and 352, as illustrated in FIG. 24. Such adjustments may be made as desired, depending upon the desired rake, cutting angle, type of material being cut, and the like.

To provide proper alignment, it may be desirable to provide, on the tool holder 334, a datum surface as indicated at 354, bearing against the jaw segments 340 so that the cutting insert 322 may be aligned properly with respect to a fixed reference in the tool holder 334.

Figure 25:
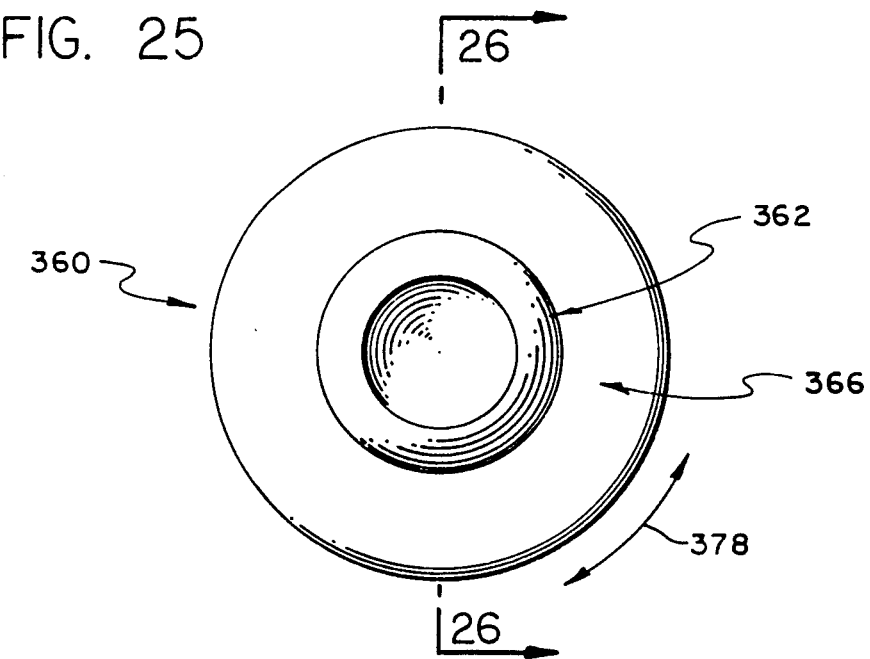
FIG. 25 illustrates another embodiments of the present invention.
Figure 26:
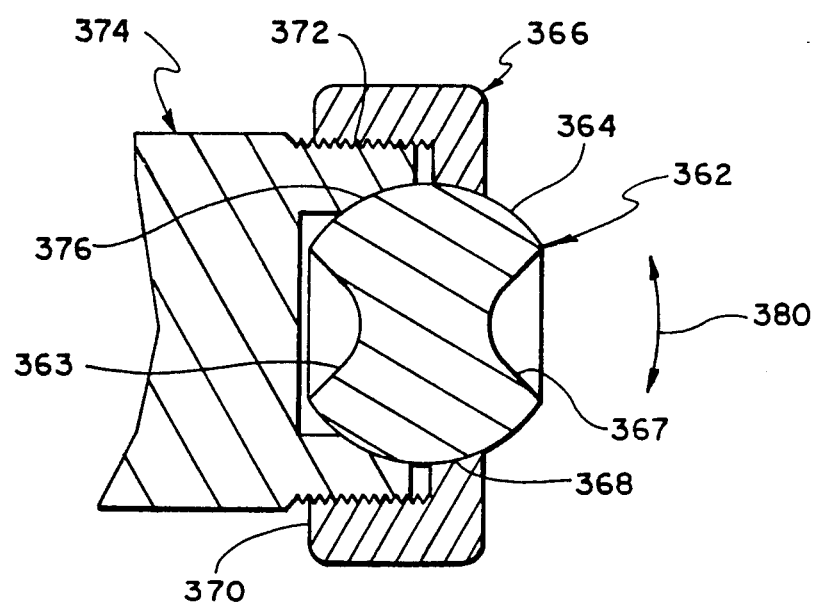
FIG. 26 is a sectional view along the line 26—26 of FIG. 25.

In FIGS. 25 and 26, there is illustrated another embodiment, generally designated 360, which is generally similar to the embodiment 320 described above, and can provide multi-axis alignment capability of the cutting insert. However, in the embodiment 360, the outer peripheral surface 364, on the cutting insert 362 is a spherical segment, and the clamping nut 366 has a concave, doubly curved second section 368, and is in engagement therewith. A first section 370, of the clamping nut 366 has threading engagement as indicated at 372 with the tool holder 374. The tool holder 374 also has a concave, doubly curved surface 376, matching the spherical surface 364 of the cutting insert 362. As illustrated, the surface 376 of the tool holder means 374 engages the outer peripheral surface 364 of the cutting insert 362 in the second end section 363 thereof, and the surface 368 of the clamping nut 366 engages the outer peripheral surface 364 of the cutting insert 362 in the first end section 367 thereof. Tightening of the clamping nut 366 on the tool holder means 374 by the threading engagement therebetween releasably clamps the cutting insert 362.

Loosening of the threaded connection at 372 between the clamping nut 366 and tool holder 374 loosens the cutting insert 362 and allows rotation for alignment thereof in multi-axis directions as indicated by the arrows 378 in FIG. 25 and 380 in FIG. 26.

It will be appreciated, as noted above, that both single end and reversible cutting inserts may be used in the various embodiments of the present invention described herein as may be desired for particular applications. Further, various features such as coolant flow orifices, chip flow grooves, lobes, and the like, may be incorporated in the various embodiments. The cutting insert utilized in the various embodiments may be of the type having a circular cutting edge or a linear cutting edge.

Figure 27:
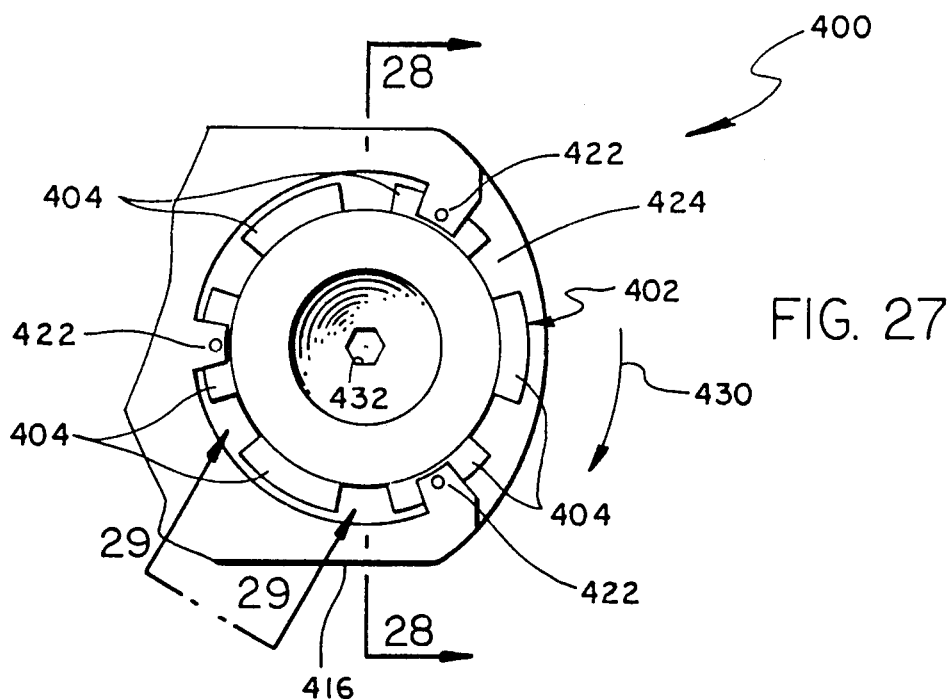
FIG. 27 illustrates another embodiment of the present invention.
Figure 28:
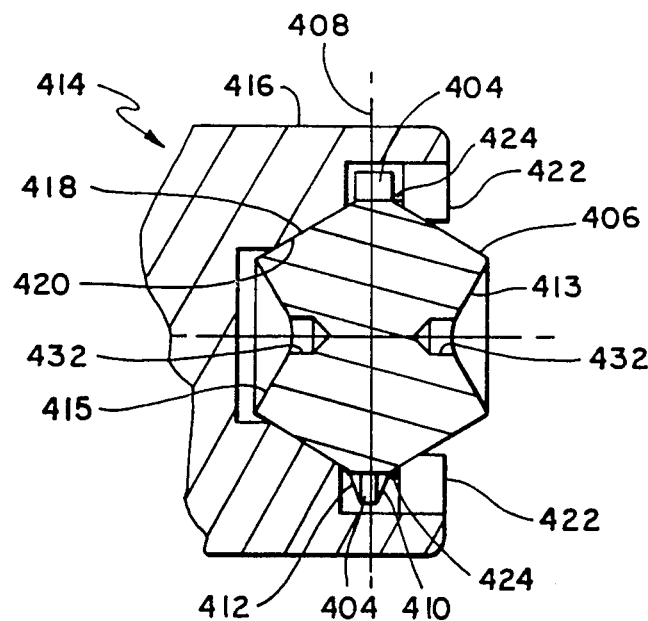
FIG. 28 is a sectional view along the line 28—28 of FIG. 27.

Another embodiment, generally designated 400, of the present invention, is illustrated in FIGS. 27 and 28. As shown, there is provided a cutting insert 402 which may be a single end cutting insert as shown in embodiment 10, or a reversible cutting insert as shown in embodiment 60. The cutting insert 402 of embodiment 400, however, is provided with a plurality of spaced apart tapered locking tab means 404. The locking tab means 404 are on the outer peripheral surface 406 at the median plane 408. Each of the tapered locking tab means 404 has circumferentially extending tapered surface 410 on the first end section 413 of the cutting insert 402, and tapered surface 412 on the second end section 415 thereof.

The mounting means 414 for the cutting insert 402 is a tool holder means 416. The tool holder means 416 has tapered bearing surface means 418 matching the tapered outer peripheral surface 420 in the second end section 415 of the insert 402 to provide a seat therefor.

The tool holder means 416 also has a plurality of spaced apart locking pad means 422 and, as illustrated, three such locking pad means 422 are shown. Each of the locking pad means 422 has a peripheral extent less than the spacing 424 between adjacent locking tab means 404, so that the locking pad means 422 may move between adjacent locking tab means 404. Each of the locking pad means 422 have an axially extending pin means 424, extending from the locking pad means toward the circumferentially extending tapered surfaces such as 410 of the plurality of locking tab means 404.

The cutting insert 402 is inserted into the tool holder 416 by aligning the cutting insert 402 so that the spacing between adjacent locking tab means 404 are aligned with the locking pad means 422. The cutting insert 402 is positioned so that the bearing surface 418 of tool holder 416 engages the outer peripheral surface of the cutting insert 402 as illustrated. The cutting insert 402 is then rotated in the direction indicated by the arrow 430 and, because of the engagement of the axially extending pin means 424 with the tapered surfaces 410 of the locking tab means 404, the cutting insert is securely wedged into position and releasably retained therein. To facilitate the rotation of the cutting insert 402, the cutting insert 402 is provided with first walls generally designated 432, defining a "hex" wrench socket.

The present invention may, of course, be utilized in applications incorporating a plurality of cutting inserts according to the principles of the present invention. FIGS. 30, 31 and 32, illustrate such a multiple cutting insert arrangement as utilized in an end mill for a cob-type cutter. As illustrated in FIGS. 30, 31, and 32, the embodiment 440 includes a tool holder generally designated 442 for an end mill (not shown). The tool holder 442 is adapted to be rotated in the direction indicated by the arrow 444 by the end mill through connection thereof at the shank end 448. It will be appreciated that the shank end 446 of the tool holder 442 is coupled into the end mill to provide such rotation.

The tool holder 442 rotates about an axis of rotation designated 448, and has an outer peripheral surface 450, an outer end surface 452, and the outer peripheral surface 450 has first walls, generally designated 454, defining a first plurality of cutting insert mounting pads. The cutting insert mounting pads defined by the first walls 454 are in a preselected spaced array, both axially and radially. In the embodiment 440, this preselected spaced array comprises four axially aligned rows of cutting inserts 456, 458, 460, and 462. In the embodiment 440, the spacing between adjacent cutting insert mounting pads in each axial row is substantially equal and each axial row is equally spaced in the radial direction around the periphery of the cutting tool 442. That is, each row is approximately 90° from the adjacent rows. Further, in the embodiment 440, the mounting pads of each of the rows are staggered with respect to each of the other rows: that is, they are not in radial alignment.

The above described arrangement of the mounting pads is, of course, selected for particular applications. In other applications, the mounting pads may be arranged in rows extending helically around the tool holder 442, more or less than four rows may be provided, more or less than four mounting pads in each row may be provided, and the like. The mounting pads in each row may be radially aligned if desired. The particular arrangement of the mounting pads may be selected for any desired application.

Additionally, the outer end surface 452 of the tool holder 442, may be provided with second walls 466 to define at least one end cutting insert mounting pad.

Each of the plurality of mounting pads defined by the first walls 454 and the end cutting insert mounting pad defined by the second walls 466 is provided with a cutting insert according to the principles of the present invention. The cutting insert may be any of the types of cutting inserts described herein. Thus, as illustrated in the embodiment 440, the cutting insert is generally similar to the cutting insert described above in connection with the embodiment 60. However, it will be appreciated that square, rectangular, or any of the other described cutting inserts may equally well be utilized. The cutting inserts generally designated 468 are mounted on the tool holder 442 by means of a locking screw 470, which threadingly engages a threaded aperture, as illustrated, for example, at 472 and 473 in the tool holder 442. It will be appreciated, of course, that the cutting insert 468 and mounting screw 470 have been omitted for clarity from the particular mounting pad at 474.

The various cutting inserts of the different types, and with the different modifications described herein, may, of course, be utilized in a variety of mounting arrangements, cutting tools and the like, in which minor changes to the geometry of the cutting insert may be made. However, such changes to accommodate mounting configurations or other considerations, do not depart from the invention described herein of the cutting insert. Further, it will be appreciated that many of the cutting inserts described herein may be interchangeably utilized in many of the mounting arrangements described herein, depending upon the particular application.

This concludes the description of the preferred embodiments of the present invention. Those skilled in the art may find many adaptations and variations thereof. The appended claims are intended to cover all such variations and adaptations falling within the true scope and spirit of the present invention.

What is claimed is:

1. A cutting insert comprising, in combination:
a body member, having an outer peripheral surface, a central axis, a median plane substantially perpendicular to said central axis, a first end section extending in a first direction from said median plane and a second end section extending in a second direction, substantially opposite said first direction from said median plane;
said first end section having:
  a first inner cutting surface tapering outwardly from said central axis in regions adjacent said median plane toward said outer peripheral surface;
  said outer peripheral surface in said first end section defining a first outer flank surface tapering inwardly from regions adjacent said median plane in said first direction toward said central axis; and
  said first flank surface intersecting said first inner cutting surface to define a first cutting edge;
whereby, said body member has a substantially increasing thickness from said first cutting edge toward said median plane.

2. The arrangement defined in claim 1 wherein:
said first cutting surface is planar;
said first flank surface is planar; and
said first cutting edge is linear.

3. The arrangement defined in claim 1 wherein:
said first cutting surface further comprises a plurality of planar segments;
said first flank surface further comprises a plurality of planar segments; and
said first cutting edge further comprises a plurality of linear cutting edge segments.

4. The arrangement defined in claim 2 wherein:
the number of said plurality of said first cutting surfaces is three;
the number of said plurality of said first flank surfaces is three; and
the number of said plurality of said linear cutting edge segments is three.

5. The arrangement defined in claim 3 wherein:
the number of said plurality of said first cutting surfaces is four;
the number of said plurality of said first flank surfaces is four; and
the number of said plurality of said linear cutting edge segments is four.

6. The arrangement defined in claim 2 and further comprising:
first walls defining a first plurality of coolant orifices extending through said body member in regions adjacent said median plane and having apertures in said first flank surface.

7. The arrangement defined in claim 2 and further comprising:
second walls defining a second plurality of coolant orifices extending through said body member in regions adjacent said central axis and having apertures in said first inner cutting surface.

8. The arrangement defined in claim 2 and further comprising:
first walls defining a first plurality of coolant orifices extending through said body member in regions adjacent said median plane and having apertures in said first flank surface; and
second walls defining a second plurality of coolant orifices extending through said body member in regions adjacent said central axis and having apertures in said first inner cutting surface.

9. A cutting insert and mounting arrangement comprising: in combination:
a body member, having an outer peripheral surface, a central axis, a median plane substantially perpendicular to said central axis, a first end section extending in a first direction from said median plane and a second end section extending in a second direction, substantially opposite said first direction from said median plane;
said first end section having:
  a first inner cutting surface tapering outwardly from said central axis in regions adjacent said median plane toward said outer peripheral surface;
  said outer peripheral surface in said first end section defining a first outer flank surface tapering inwardly from regions adjacent said median plane in said first direction toward said central axis; and
  said first flank surface intersecting said first inner cutting surface to define a first cutting edge;
whereby, said body member has a substantially increasing thickness from said first cutting edge toward said median plane;

tool holder means for holding said body member, and said tool holder means engaging said peripheral surface of said body member in regions spaced from said cutting edge; and mounting means for mounting said body member on said tool holder means.

10. The arrangement defined in claim 9 wherein:
said tool holder means engages said peripheral surface of said body member on the opposite side of said median plane from said cutting edge.

11. The arrangement defined in claim 2 and further comprising:
land surface portion on said first inner cutting surface extending a first preselected distance from said cutting edge toward said median plane at an angle different from the angle of taper of said first cutting surface, and having an inner land edge intermediate said first cutting edge and said median plane; and
a plurality of chip flow grooves on said first inner cutting surface and extending from said inner land edge toward said median plane.

12. The arrangement defined in claim 11 wherein:
said chip flow grooves are progressively deeper from said inner land edge toward said median plane; and
said plurality of chip flow grooves extend generally helically from said inner land edge toward said median plane.

13. The arrangement defined in claim 12 and further comprising:
first walls defining a first plurality of coolant orifices extending through said body member in regions adjacent said median plane and having apertures in said first flank surface.

14. The arrangement defined in claim 12 and further comprising:
second walls defining a second plurality of coolant orifices extending through said body member in regions adjacent said central axis and having apertures in said first cutting surface.

15. The arrangement defined in claim 12 and further comprising:
first walls defining a first plurality of coolant orifices extending through said body member in regions adjacent said median plane and having apertures in said first flank surface; and
second walls defining a second plurality of coolant orifices extending through said body member in regions adjacent said central axis and having apertures in said first cutting surface.

16. The arrangement defined in claim 2 and further comprising:
said first flank surface having a plurality of lobe portions thereon, extending radially outwardly therefrom.

17. The arrangement defined in claim 16 and further comprising:
first walls defining a first plurality of coolant orifices extending through said body member in regions adjacent said median plane and having apertures in said first flank surface.

18. The arrangement defined in claim 16 and further comprising:
second walls defining a second plurality of coolant orifices extending through said body member in regions adjacent said central axis and having apertures in said first cutting surface.

19. The arrangement defined in claim 16 and further comprising:

first wall defining a first plurality of coolant orifices extending through said body member in regions adjacent said median plane and having apertures in said first flank surface; and
second walls defining a second plurality of coolant orifices extending through said body member in regions adjacent said central axis and having apertures in said first cutting surface.

20. The arrangement defined in claim 2 and further comprising:
land surface portion on said first inner cutting surface extending a first preselected distance from said cutting edge toward said median plane at an angle different from the angle of taper of said first cutting surface, and having an inner land edge intermediate said first cutting edge and said median plane;
a plurality of chip flow grooves on said first inner cutting surface and extending from said inner land edge toward said median plane;
said chip flow grooves are progressively deeper from said inner land edge toward said median plane;
said plurality of chip flow grooves extend generally helically from said inner land edge toward said median plane;
first walls defining a first plurality of coolant orifices extending through said body member in regions adjacent said median plane and having apertures in said first flank surface; and
second walls defining a second plurality of coolant orifices extending through said body member in regions adjacent said central axis and having apertures in said first cutting surface; and
said first flank surface having a plurality of lobe portions thereon, extending radially outwardly therefrom.

21. A cutting insert comprising, in combination:
a body member, having an outer peripheral surface, a central axis, a median plane substantially perpendicular to said central axis, a first end section extending in a first direction from said median plane and a second end section extending in a second direction, substantially opposite said first direction from said median plane;
said first end section having:
a first inner cutting surface tapering outwardly from said central axis in regions adjacent said median plane toward said outer peripheral surface;
said outer peripheral surface in said first end section defining a first outer flank surface tapering inwardly from regions adjacent said median plane in said first direction toward said central axis; and
said first flank surface intersecting said first inner cutting surface to define a first cutting edge;
said second end section having:
a second inner cutting surface tapering outwardly in said second direction from said central axis in regions adjacent said median plane toward said outer peripheral surface;
said outer peripheral surface in said second end section defining a second outer flank surface tapering inwardly from regions adjacent said median plane toward said central axis in said second direction; and
said second flank surface intersecting said second cutting surface to define a second cutting edge, and said second cutting edge spaced axially from said first cutting edge;

whereby, said body member has a substantially increasing thickness from each of said first and second cutting edges toward said median plane.

22. The arrangement defined in claim 21 wherein:
at least one of first and second cutting surfaces are planar;
at least one of said first and second flank surfaces are planar; and
at least one of said first and second cutting edges are linear.

23. The arrangement defined in claim 21 wherein:
at least one of said first and second cutting surfaces comprise a plurality of planar segments;
at least one of said first and second flank surfaces comprise a plurality of planar surfaces; and
at least one of said first and second cutting edges comprise a plurality of linear cutting edge segments.

24. The arrangement defined in claim 21 and further comprising:
first walls defining a first plurality of coolant orifices extending through said body member in regions adjacent said median plane and having apertures in said first flank surface and said second flank surface.

25. The arrangement defined in claim 21 and further comprising:
second walls defining a second plurality of coolant orifices extending through said body member in regions adjacent said central axis and having apertures in said first and second inner cutting surfaces.

26. The arrangement defined in claim 22 wherein:
land surface portions on said first and second inner cutting surfaces extending a first preselected distance from said first and second cutting edges toward said median plane and having an angle of taper different than the angle of taper of said first and said second inner cutting surfaces, and having inner land edges intermediate said first and said second cutting edges and said median plane, respectively; and
a plurality of chip flow grooves on said first and said second cutting surfaces and extending from said inner land edges toward said median plane.

27. The arrangement defined in claim 26, wherein:
said chip flow grooves are progressively deeper from said inner land edges toward said median plane.

28. The arrangement defined in claim 27, whrein:
first walls defining a first plurality of coolant orifices extending through said body member in regions adjacent said median plane and having apertures in said first flank surface and said second flank surface.

29. The arrangement defined in claim 27, wherein:
second walls defining a second plurality of coolant orifices extending through said body member in regions adjacent said central axis and having apertures in said first and second cutting surfaces.

30. The arrangement defined in claim 27 and further comprising:
first walls defining a first plurality of coolant orifices extending through said body member in regions adjacent said median plane and having apertures in said first flank surface and said second flank surface; and second walls defining a second plurality of coolant orifices extending through said body member in regions adjacent said central axis and having apertures in said first and second cutting surfaces.

31. The arrangement defined in claim 22 and further comprising:
at least one of said first and said second flank surfaces having a plurality of lobe portions thereon, extending radially outwardly therefrom.

32. The arrangement defined in claim 11 wherein:
said plurality of chip flow grooves are progressively deeper from said median plane toward said inner land edge; and
said plurality of chip flow grooves extend generally helically from said inner land edge toward said median plane.

33. The arrangement defined in claim 26 wherein:
said plurality of chip flow grooves are progressively deeper from said median plane toward said inner land edge; and
said plurality of chip flow grooves extend generally helically from said inner land edge toward said median plane.

34. A cutting insert and mounting arrangement comprising; in combination:
a body member, having an outer peripheral surface, a central axis, a median plane substantially perpendicular to said central axis, a first end section extending in a first direction from said median plane and a second end section extending in a second direction, substantially opposite said first direction from said median plane;
said first end section having:
a first inner cutting surface tapering outwardly from said central axis in regions adjacent said median plane toward said outer peripheral surface;
said outer peripheral surface in said first end section defining a first outer flank surface tapering inwardly from regions adjacent said median plane in said first direction toward said central axis; and
said first flank surface intersecting said first inner cutting surface to define a first cutting edge;
whereby, said body member has a substantially increasing thickness from said first cutting edge toward said median plane;
mounting means for said body member, said mounting means comprising:
tool holder means having a tapered mounting surface engaging said outer peripheral surface of said body member; and
clamping means mounted on said tool holder means and having clamping surface means clampingly engaging said outer peripheral surface of said body member for retaining said body member between said tool holder means and said clamping means.

35. A cutting insert and mounting arrangement comprising; in combination:
a body member, having an outer peripheral surface, a central axis, a median plane substantially perpendicular to said central axis, a first end section extending in a first direction from said median plane and a second end section extending in a second direction, substantially opposite said first direction from said median plane;
said first end section having:

a first inner cutting surface tapering outwardly from said central axis in regions adjacent said median plane toward said outer peripheral surface;

said outer peripheral surface in said first end section defining a first outer flank surface tapering inwardly from regions adjacent said median plane in said first direction toward said central axis; and said first flank surface intersecting said first inner cutting surface to define a first cutting edge;

whereby, said body member has a substantially increasing thickness from said first cutting edge toward said median plane;

mounting means for said body member, said mounting means comprising:

tool holder means:

collet means mounted in said tool holder means and having a plurality of clamping jaws, said plurality of clamping jaws movable toward and away from each other and engaging said tool holder means and an inner surface clampingly engaging said body menber on said outer peripheral surface thereof, and means for centering said collet means in said tool holder means and for moving said collet in a first direction to tighten said clamping jaws on said body member and in a second direction to loosen said clamping jaws from said body member.

36. A cutting insert comprising, in combination:

a body member, having an outer peripheral surface, a central axis, a median plane substantially perpendicular to said central axis, a first end section extending in a first direction from said median plane and a second end section extending in a second direction, substantially opposite said first direction from said median plane;

said first end section having:

a first inner cutting surface tapering outwardly from said central axis in regions adjacent said median plane toward said outer peripheral surface;

said outer peripheral surface in said first end section having a first portion defining a first outer flank surface tapering inwardly in said first direction toward said central axis, and a mounting surface portion defining a concave, double curved mounting surface;

said first flank surface intersecting said first inner cutting surface to define a first cutting edge.

37. A cutting insert comprising, in combination:

a body member, having an outer peripheral surface, a central axis, a median plane substantially perpendicular to said central axis, a first end section extending in a first direction from said median plane and a second end section extending in a second direction, substantially opposite said first direction from said median plane;

said first end section having:

a first inner cutting surface tapering outwardly from said central axis in regions adjacent said median plane toward said outer peripheral surface;

said outer peripheral surface in said first end section having a first portion defining a first outer flank surface tapering inwardly in said first direction toward said central axis, and said first flank surface intersecting said first inner cutting surface to define a first cutting edge;

said second end section having:

a second inner cutting surface tapering outwardly in said second direction from said central axis in regions adjacent said median plane toward said outer peripheral surface;

said outer peripheral surface in said second end section having a second portion defining a second outer flank surface tapering inwardly toward said central axis in said second direction, and said second flank surface intersecting said second cutting surface to define a second cutting edge, and said second cutting edge spaced axially from said first cutting edge; and said outer peripheral surface having a mounting surface portion defining a concave doubly curved mounting surface in regions between said first and said second outer flank surfaces.

38. A cutting insert amd mounting arrangement, comprising, in combination:

a body member, having an outer peripheral surface, a central axis, a median plane substantially perpendicular to said central axis, a first end section extending in a first direction from said median plane and a second end section extending in a second direction, substantially opposite said first direction from said median plane;

said first end section having:

a first inner cutting surface tapering outwardly from said central axis in regions adjacent said median plane toward said outer peripheral surface;

said outer peripheral surface in said first end section having a first portion defining a first outer flank surface tapering inwardly in said first direction toward said central axis, and a mounting surface portion defining a concave, doubly curved mounting surface;

said first flank surface intersecting said first inner cutting surface to define a first cutting edge;

mounting means for said body member, said mounting means comprising:

tool holder means;

a plurality of jaw segments having an outer surface and an inner surface, said inner surface of said jaw segments doubly curved spherical segments matching said doubly curved concave mounting surface of said body member and in clamping engagement therewith;

clamping nut means having a first section for threadingly engaging said tool holder means and a second section for clampingly engaging said plurality of jaw segments for releasably retaining said body member.

39. A cutting insert comprising, in combination:

a body member, having an outer peripheral surface, a central axis, a median plane substantially perpendicular to said central axis, a first end section extending in a first direction from said median plane and a second end section extending in a second direction, substantially opposite said first direction from said median plane;

said first end section having:

a first inner cutting surface tapering outwardly from said central axis in regions adjacent said median plane toward said outer peripheral surface;

said outer peripheral surface in said first end section defining a first outer flank surface extending inwardly from regions adjacent said median plane in said first direction toward said central axis, and said outer peripheral surface having a mounting surface portion thereof and said mounting surface portion defining a spherical segment;

said first flank surface intersecting said first inner cutting surface to define a first cutting edge.

40. A cutting insert comprising, in combination:

a body member, having an outer peripheral surface, a central axis, a median plane substantially perpendicular to said central axis, a first end section extending in a first direction from said median plane and a second end section extending in a second direction, substantially opposite said first direction from said median plane;

said first end section having:
- a first inner cutting surface tapering outwardly from said central axis in regions adjacent said median plane toward said outer peripheral surface;
- said outer peripheral surface in said first end section defining a first outer flank surface extending inwardly from regions adjacent said median plane in said first direction toward said central axis; and
- said first flank surface intersecting said first inner cutting surface to define a first cutting edge;

said second end section having:
- a second inner cutting surface tapering outwardly in said second direction from said central axis in regions adjacent said median plane toward said outer peripheral surface;
- said outer peripheral surface in said second end section defining a second outer flank surface extending inwardly from regions adjacent said median plane toward said central axis in said second direction;
- said second flank surface intersecting said second cutting surface to define a second cutting edge, and said second cutting edge spaced axially from said first cutting edge; and said outer peripheral surface having a mounting surface portion thereof and said mounting surface portion defining a spherical segment.

41. A cutting insert and mounting arrangement, comprising, in combination:

a body member, having an outer peripheral surface, a central axis, a median plane substantially perpendicular to said central axis, a first end section extending in a first direction from said median plane and a second end section extending in a second direction, substantially opposite said first direction from said median plane;

said first end section having:
- a first inner cutting surface tapering outwardly from said central axis in regions adjacent said median plane toward said outer peripheral surface;
- said outer peripheral surface in said first end section defining a first outer flank surface extending inwardly from regions adjacent said median plane in said first direction toward said central axis, and said outer peripheral surface having a mounting surface portion thereof and said mounting surface portion defining a spherical segment;

said first flank surface intersecting said first inner cutting surface to define a first cutting edge;

mounting means for said body member, said mounting means comprising:
tool holder means having a concave, doubly curved, surface matching said mounting surface of said body member and in engagement therewith;
clamping nut means having a threaded section for threadingly engaging said tool holder means, and a clamping surface, said clamping surface defining a concave, doubly curved surface matching said mounting surface of said body member and in releasable clamping engagement therewith for releasably retaining said body member.

42. A cutting insert comprising, in combination:

a body member, having an outer peripheral surface, a central axis, a median plane substantially perpendicular to said central axis, a first end section extending in a first direction from said median plane and a second end section extending in a second direction, substantially opposite said first direction from said median plane;

said first end section having:
- a first inner cutting surface tapering outwardly from said central axis in regions adjacent said median plane toward said outer peripheral surface;
- said outer peripheral surface in said first end section defining a first outer flank surface tapering inwardly from regions adjacent said median plane in said first direction toward said central axis;
- said first flank surface intersecting said first inner cutting surface to define a first cutting edge; and
- said outer peripheral surface having walls defining a mounting groove means therein in regions adjacent said median plane and said mounting groove extending inwardly toward said central axis.

43. A cutting insert comprising, in combination:

a body member, having an outer peripheral surface, a central axis, a median plane substantially perpendicular to said central axis, a first end section extending in a first direction from said median plane and a second end section extending in a second direction, substantially opposite said first direction from said median plane;

said first end section having:
- a first inner cutting surface tapering outwardly from said central axis in regions adjacent said median plane toward said outer peripheral surface;
- said outer peripheral surface in said first end section defining a first outer flank surface tapering inwardly from regions adjacent said median plane in said first direction toward said central axis; and
- said first flank surface intersecting said first inner cutting surface to define a first cutting edge;

said second end section having:
- a second inner cutting surface tapering outwardly in said second direction from said central axis in regions adjacent said median plane toward said outer peripheral surface;

said outer peripheral surface in said second end section defining a second outer flank surface tapering inwardly from regions adjacent said median plane toward said central axis in said second direction;

said second flank surface intersecting said second cutting surface to define a second cutting edge, and said second cutting edge spaced axially from said first cutting edge;

said outer peripheral surface having walls defining a mounting groove means therein in regions adjacent said median plane and said mounting groove extending inwardly toward said central axis.

44. An arrangement as defined in claims 42 or 43 wherein:
said groove is "V" shaped.

45. An arrangement as defined in claims 42 or 43 wherein:
said groove is "U" shaped.

46. A cutting insert and mounting arrangement, comprising, in combination:
a body member, having an outer peripheral surface, a central axis, a median plane substantially perpendicular to said central axis, a first end section extending in a first direction from said median plane and a second end section extending in a second direction, substantially opposite said first direction from said median plane;
said first end section having:
a first inner cutting surface tapering outwardly from said central axis in regions adjacent said median plane toward said outer peripheral surface;
said outer peripheral surface in said first end section defining a first outer flank surface tapering inwardly from regions adjacent said median plane in said first direction toward said central axis;
said first flank surface intersecting said first inner cutting surface to define a first cutting edge; and
said outer peripheral surface having walls defining a mounting groove means therein in regions adjacent said median plane and said mounting groove extending inwardly toward said central axis;
mounting means for said body member and said mounting means comprising:
tool holder means having a bearing surface engaging said outer peripheral surface of said body member in said second end section;
clamping means mounted on said tool holder means and having clamping surface means engaging said first walls of said outer peripheral surface in said mounting groove means of said body member for releasably retaining said body 47. A cutting insert comprising, in combination:
a body member, having an outer peripheral surface, a central axis, a median plane substantially perpendicular to said central axis, a first end section extending in a first direction from said median plane and a second end section extending in a second direction, substantially opposite said first direction from said median plane;
said first end section having:
a first inner cutting surface tapering outwardly from said central axis in regions adjacent said median plane toward said outer peripheral surface;
said outer peripheral surface in said first end section defining a first outer flank surface tapering inwardly from regions adjacent said median plane in said first direction toward said central axis;
said first flank surface intersecting said first inner cutting surface to define a first cutting edge;
a plurality of spaced apart tapered locking tab means mounted on said outer peripheral surface of said cutting insert in regions adjacent said median plane, and said tapered locking tab means having circumferentially extending tapered surfaces.

48. A cutting insert comprising, in combination:
a body member, having an outer peripheral surface, a central axis, a median plane substantially perpendicular to said central axis, a first end section extending in a first direction from said median plane and a second end section extending in a second direction, substantially opposite said first direction from said median plane;
said first end section having:
a first inner cutting surface tapering outwardly from said central axis in regions adjacent said median plane toward said outer peripheral surface;
said outer peripheral surface in said first end section defining a first outer flank surface tapering inwardly from regions adjacent said median plane in said first direction toward said central axis; and
said first flank surface intersecting said first inner cutting surface to define a first cutting edge;
said second end section having:
a second inner cutting surface tapering outwardly in said second direction from said central axis in regions adjacent said median plane toward said outer peripheral surface;
said outer peripheral surface in said second end section defining a second outer flank surface tapering inwardly from regions adjacent said median plane toward said central axis in said second direction; and
said second flank surface intersecting said second cutting surface to define a second cutting edge, and said second cutting edge spaced axially from said first cutting edge;
a plurality of spaced apart tapered locking tab means mounted on said outer peripheral surface of said cutting insert in regions adjacent said median plane, and said tapered locking tab means having circumferentially extending tapered surfaces.

49. A cutting insert and mounting arrangement, comprising, in combination:
a body member, having an outer peripheral surface, a central axis, a median plane substantially perpendicular to said central axis, a first end section extending in a first direction from said median plane and a second end section extending in a second direction, substantially opposite said first direction from said median plane;
said first end section having:
a first inner cutting surface tapering outwardly from said central axis in regions adjacent said median plane toward said outer peripheral surface;
said outer peripheral surface in said first end section defining a first outer flank surface tapering inwardly from regions adjacent said median plane in said first direction toward said central axis;

said first flank surface intersecting said first inner cutting surface to define a first cutting edge;

a plurality of spaced apart tapered locking tab means mounted on said outer peripheral surface of said cutting insert in regions adjacent said median plane, and said tapered locking tab means having circumferentially extending tapered surfaces;

mounting means for said body member, said mounting means comprising;

tool holder means having:

bearing surface means engaging said outer peripheral surface of said body member in said second end section thereof;

a plurality of locking pad means, each of said plurality of locking pad means having a peripheral extent less than the spacing apart of said locking tab means of said body member;

each of said locking pad means having an axially extending pin means extending from said locking pads toward said circumferentially extending tapered surfaces of said locking tab means;

whereby rotation of said body member in a first direction clampingly secures said body member between said pin means and said bearing surface, and rotation of said body member in a second direction, opposite said first direction, releases said body member.

50. A rotating cutting tool and cutting insert arrangement comprising, in combination:

a rotating tool holder having an axis of rotation, an outer peripheral surface, an outer end surface, and an inner end, said outer peripheral surface having first walls defining a first plurality of cutting insert mounting pads in a preselected spaced array;

a plurality of cutting inserts, one of said cutting inserts mounted in each of said mounting pads, and each of said cutting inserts comprising:

a body member, having an outer peripheral surface, a central axis, a median plane substantially perpendicular to said central axis, a first end section extending in a first direction from said median plane and a second end section extending in a second direction, substantially opposite said first direction from said median plane;

said first end section having:

a first inner cutting surface tapering outwardly from said central axis in regions adjacent said median plane toward said outer peripheral surface;

said outer peripheral surface in said first end section defining a first outer flank surface tapering inwardly from regions adjacent said median plane in said first direction toward said central axis;

said first flank surface intersecting said first inner cutting surface to define a first cutting edge; and securing means for mounting each of said cutting inserts in said plurality of cutting insert mounting pads.

51. An arrangement as defined in claim 50 wherein:
said preselected spaced array comprises four axially aligned rows in equal peripheral spacings about said axis of rotation, and each of said mounting pads in each of said axially aligned rows in equal spaced apart array.

52. An arrangement as defined in claim 51 wherein:
each of said four rows are in an axially staggered alignment with respect to the other of said rows.

53. An arrangement as defined in claims 50, 51, or 52, and further comprising:

said outer end surfaces of said tool holder comprises second walls defining at least one end cutting insert mounting pad;

an end cutting insert substantially identical to said plurality of cutting inserts mounted in said at least one end cutting insert mounting pad; and cutter securing means for securing said end cutting insert in said end cutting insert mounting pad.

54. An arrangement as defined in claim 53 wherein:
said securing means and said end cutter securing means comprises a lock screw means extending axially through said cutting inserts and said end cutting insert and threadingly engaging said tool holder.

55. A rotating cutting tool comprising, in combination:

a rotating tool holder having an axis of rotation, an outer peripheral surface, an outer end surface, and an inner end, said outer peripheral surface having first walls defining a first plurality of cutting insert mounting pads in a preselected spaced array;

a plurality of cutting inserts, one of said cutting inserts mounted in each of said mounting pads, and each of said conical cutting inserts comprising:

a body member, having an outer peripheral surface, a central axis, a median plane substantially perpendicular to said central axis, a first end section extending in a first direction from said median plane and a second end section extending in a second direction, substantially opposite said first direction from said median plant;

said first end section having:

a first inner cutting surface tapering outwardly from said central axis in regions adjacent said median plane toward said outer peripheral surface;

said outer peripheral surface in said first end section defining a first outer flank surface tapering inwardly from regions adjacent said median plane in said first direction toward said central axis; and said first flank surface intersecting said first inner cutting surface to define a first cutting edge;

said second end section having:

a second inner cutting surface tapering outwardly in said second direction from said central axis in regions adjacent said median plane toward said outer peripheral surface;

said outer peripheral surface in said second end section defining a second outer flank surface tapering inwardly from regions adjacent said median plane toward said central axis in said second direction;

said second flank surface intersecting said second cutting surface to define a second cutting edge, and said second cutting edge spaced axially from said first cutting edge; and securing means for mounting each of said cutting inserts in said plurality of cutting insert mounting pads.

56. An arrangement as defined in claim 55 wherein:

said preselected spaced array comprises four axially aligned rows in equal peripheral spacings about said axis or rotation, and each of said mounting pads in each of said axially aligned rows in equal spaced apart array.

57. An arrangement as defined in claim 56 wherein: each of said four rows are in an axially staggered alignment with respect to the other of said rows.

58. An arrangement as defined in claims 55, 56, or 57, and further comprising:
said outer end surface of said tool holder comprises second walls defining at least one end cutting insert mounting pad;
an end cutting insert substantially identical to said plurality of cutting inserts mounted in said at least one end cutting insert mounting pad; and
cutter securing means for securing said end cutting insert in said end cutting insert mounting pad.

59. A cutting insert and mounting arrangement comprising, in combination:
a body member, having an outer peripheral surface, a central axis, a median plane substantially perpendicular to said central axis, a first end section extending in a first direction from said median plane and a second end section extending in a second direction, substantially opposite said first direction from said median plane;
said first end section having:
a first inner cutting surface tapering outwardly from said central axis in regions adjacent said median plane toward said outer peripheral surface;
said outer peripheral surface in said first end section defining a first outer flank surface tapering inwardly from regions adjacent said median plane in said first direction toward said central axis; and
said first flank surface intersecting said first inner cutting surface to define a first cutting edge;
said second end section having:
a second inner cutting surface tapering outwardly in said second direction from said central axis in regions adjacent said median plane toward said outer peripheral surface;
said outer peripheral surface in said second end section defining a second outer flank surface tapering inwardly from regions adjacent said median plane toward said central axis in said second direction; and
said second flank surface intersecting said second cutting surface to define a second cutting edge, and said second cutting edge spaced axially from said first cutting edge;
whereby, said body member has a substantially increasing thickness from each of said first and second cutting edges toward said median plane;
mounting means for said body member, said mounting means comprising:
tool holder means having a tapered mounting surface engaging said outer peripheral surface of said body member, and
clamping means mounted on said tool holder means and having clamping surface means clampingly engaging said outer peripheral surface of said body member for retaining said body member between said tool holder means and said clamping means.

60. A cutting insert and mounting arrangement comprising, in combination:
a body member, having an outer peripheral surface, a central axis, a median plane substantially perpendicular to said central axis, a first end section extending in a first direction from said median plane and a second end section extending in a second direction, substantially opposite said first direction from said median plane;
said first end section having:
a first inner cutting surface tapering outwardly from said central axis in regions adjacent said median plane toward said outer peripheral surface;
said outer peripheral surface in said first end section defining a first outer flank surface tapering inwardly from regions adjacent said median plane in said first direction toward said central axis; and
said first flank surface intersecting said first inner cutting surface to define a first cutting edge;
said second end section having:
a second inner cutting surface tapering outwardly in said second direction from said central axis in regions adjacent said median plane toward said outer peripheral surface;
said outer peripheral surface in said second end section defining a second outer flank surface tapering inwardly from regions adjacent said median plane toward said central axis in said second direction; and
said second flank surface intersecting said second cutting surface to define a second cutting edge, and said second cutting edge spaced axially from said first cutting edge;
whereby, said body member has a substantially increasing thickness from each of said first and second cutting edges toward said median plane;
mounting means for said body member comprising:
tool holder means:
collet means mounted in said tool holder means and having a plurality of clamping jaws, said plurality of clamping jaws movable toward and away from each other and each of said clamping jaws having an outer surface slidingly engaging said tool holder means and an inner surface clampingly engaging said body member on said outer peripheral surface thereof in said first and second end sections thereof; and
means for centering said collet means in said tool holder means and for moving said collet in a first direction to tighten said clamping jaws on said body member and in a second direction to loosen said clamping jaws from said body member.

61. A cutting insert and mounting arrangement comprising, in combination:
a body member, having an outer peripheral surface, a central axis, a median plane substantially perpendicular to said central axis, a first end section extending in a first direction from said median plane and a second end section extending in a second direction, substantially opposite said first direction from said median plane;
said first end section having:
a first inner cutting surface tapering outwardly from said central axis in regions adjacent said median plane toward said outer peripheral surface;
said outer peripheral surface in said first end section having a first portion defining a first outer flank surface tapering inwardly in said first direction toward said central axis, and said first flank surface intersecting said first inner cutting surface to define a first cutting edge;

said second end section having:

a second inner cutting surface tapering outwardly in said second direction from said central axis in regions adjacent said median plane toward said outer peripheral surface;

said outer peripheral surface in said second end section having a second portion defining a second outer flank surface tapering inwardly toward said central axis in said second direction, and said second flank surface intersecting said second cutting surface to define a second cutting edge, and said second cutting edge spaced axially from said first cutting edge; and said outer peripheral surface having a mounting surface portion defining a concave doubly curved mounting surface in regions between said first and said second outer flank surfaces;

mounting means on said body member comprising:

tool holder means;

a plurality of jaw segments having an outer surface and an inner surface, said inner surface of said jaw segments doubly curved spherical segments matching said doubly curved concave mounting surface of said body member and in clamping engagement therewith;

clamping nut means having a first section for threadingly engaging said tool holder means and a second section for clampingly engaging said plurality of jaw segments for releasably retaining said body means.

62. A cutting insert and mounting arrangement comprising, in combination:

a body member, having an outer peripheral surface, a central axis, a median plane substantially perpendicular to said central axis, a first end section extending in a first direction from said median plane and a second end section extending in a second direction, substantially opposite said first direction from said median plane;

said first end section having:

a first inner cutting surface tapering outwardly from said central axis in regions adjacent said median plane toward said outer peripheral surface;

said outer peripheral surface in said first end section defining a first outer flank surface extending inwardly from regions adjacent said median plane in said first direction toward said central axis; and said first flank surface intersecting said first inner cutting surface to define a first cutting edge;

said second end section having:

a second inner cutting surface tapering outwardly in said second direction from said central axis in regions adjacent said median plane toward said outer peripheral surface;

said outer peripheral surface in said second end section defining a second outer flank surface extending inwardly from regions adjacent said median plane toward said central axis in said second direction;

said second flank surface intersecting said second cutting surface to define a second cutting edge, and said second cutting edge spaced axially from said first cutting edge; and said outer peripheral surface having a mounting surface portion thereof and said mounting surface portion defining a spherical segment;

mounting means for said body member, said mounting means comprising:

tool holder means having a concave, doubly curved, surface matching said mounting surface of said body member and in engagement therewith;

clamping nut means having a threaded section for threadingly engaging said tool holder means, and a clamping surface, said clamping surface defining a concave, doubly curved surface matching said mounting surface of said body means and in releasable clamping engagement therewith for releasably retaining said body means.

63. A cutting insert and mounting arrangement comprising, in combination:

a body member, having an outer peripheral surface, a central axis, a median plane substantially perpendicular to said central axis, a first end section extending in a first direction from said median plane and a second end section extending in a second direction, substantially opposite said first direction from said median plane;

said first end section having:

a first inner cutting surface tapering outwardly from said central axis in regions adjacent said median plane toward said outer peripheral surface;

said outer peripheral surface in said first end section defining a first outer flank surface tapering inwardly from regions adjacent said median plane in said first direction toward said central axis; and said first flank surface intersecting said first inner cutting surface to define a first cutting edge;

said second end section having:

a second inner cutting surface tapering outwardly in said second direction from said central axis in regions adjacent said median plane toward said outer peripheral surface;

said outer peripheral surface in said second end section defining a second outer flank surface tapering inwardly from regions adjacent said median plane toward said central axis in said second direction;

said second flank surface intersecting said second cutting surface to define a second cutting edge, and said second cutting edge spaced axially from said first cutting edge;

a mounting groove means therein in regions adjacent said median plane and said mounting groove extending inwardly toward said central axis;

mounting means for said body member and said mounting means comprising:

tool holder means having a bearing surface engaging said outer peripheral surface of said body member;

clamping means mounted on said tool holder means and having clamping surface means engaging said peripheral surface in said mounting groove means of said body member for releasably retaining said body member.

64. A cutting insert and mounting arrangement comprising, in combination:

a body member, having an outer peripheral surface, a central axis, a median plane substantially perpendicular to said central axis, a first end section extending in a first direction from said median plane and a second end section extending in a second direction, substantially opposite said first direction from said median plane;

said first end section having:
- a first inner cutting surface tapering outwardly from said central axis in regions adjacent said median plane toward said outer peripheral surface;
- said outer peripheral surface in said first end section defining a first outer flank surface tapering inwardly from regions adjacent said median plane in said first direction toward said central axis; and
- said first flank surface intersecting said first inner cutting surface to define a first cutting edge;

said second end section having:
- a second inner cutting surface tapering outwardly in said second direction from said central axis in regions adjacent said median plane toward said outer peripheral surface;
- said outer peripheral surface in said second end section defining a second outer flank surface tapering inwardly from regions adjacent said median plane toward said central axis in said second direction; and
- said second flank surface intersecting said second cutting surface to define a second cutting edge, and said second cutting edge spaced axially from said first cutting edge;

a plurality of spaced apart tapered locking tab means mounted on said outer peripheral surface of said cutting insert in regions adjacent said median plane, and said tapered locking tab means having circumferentially extending tapered surfaces;

mounting means for said body member, said mounting means comprising;

tool holder means having:
- bearing surface means engaging said outer peripheral surface of said body member in said second end section thereof;
- a plurality of locking pad means, each of said plurality of locking pad means having a peripheral extent less than the spacing apart of said locking tab means of said body member;
- each of said locking pad means having an axially extending pin means extending from said locking pads toward said circumferentially extending tapered surfaces of said locking tab means;
- whereby rotation of said body member in a first direction clampingly secures said body member between said pin means and said bearing surface, and rotation of said body member in a second direction, opposite said first direction releases said body member.

65. The arrangement defined in claims 34, 35, 36, 39, 41, 42, 46, 47, 49, or 50, wherein:
said first inner cutting surface is planar;
said first flank surface is planar;
said first cutting edge is linear.

66. The arrangement defined in claims 37, 40, 43, 48, 55, 59, 60, 61, 62, 63, or 64, wherein:
at least one of said first and second inner cutting surfaces is planar;
at least one of said first and second flank surfaces is planar; and
at least one of said first and second cutting edges is linear.

67. The arrangement defined in claims 34, 35, 36, 39, 41, 42, 46, 47, 49, or 50, wherein:
said first cutting surface further comprises a plurality of planar segments;
said first flank surface further comprises a plurality of planar segments; and
said first cutting edge further comprises a plurality of linear cutting edge segments.

68. The arrangement defined in claims 37, 40, 43, 48, 55, 59, 60, 61, 62, 63, or 64, wherein:
at least one of said first and second cutting surfaces comprise a plurality of planar segments;
at least one of said first and second flank surfaces comprise a plurality of planar surfaces; and
at least one of said first and second cutting edges comprise a plurality of linear cutting edge segments.

* * * * *